US008510265B1

(12) United States Patent
Boone et al.

(10) Patent No.: US 8,510,265 B1
(45) Date of Patent: Aug. 13, 2013

(54) CONFIGURATION UTILITY FOR A DATA STORAGE SYSTEM USING A FILE MAPPING PROTOCOL FOR ACCESS TO DISTRIBUTED FILE SYSTEMS

(75) Inventors: David Boone, Cary, NC (US); Michael S. Traudt, Bellingham, MA (US); Karl M. Connolly, Westborough, MA (US); Nagaraj Chidambarathanupillai, Tamil Nadu (IN)

(73) Assignee: EMC Corporation, Hopkinton, MA (US)

( * ) Notice: Subject to any disclaimer, the term of this patent is extended or adjusted under 35 U.S.C. 154(b) by 607 days.

(21) Appl. No.: 12/751,934

(22) Filed: Mar. 31, 2010

(51) Int. Cl.
*G06F 7/00* (2006.01)
*G06F 17/00* (2006.01)

(52) U.S. Cl.
USPC ........... 707/609; 707/705; 707/790; 709/221; 709/222

(58) Field of Classification Search
USPC ................. 707/609, 705, 790, 899; 709/220, 709/221, 222
See application file for complete search history.

(56) References Cited

U.S. PATENT DOCUMENTS

| | | | |
|---|---|---|---|
| 5,394,522 A * | 2/1995 | Sanchez-Frank et al. | 715/735 |
| 5,893,140 A | 4/1999 | Vahalia et al. | |
| 6,324,581 B1 | 11/2001 | Xu et al. | |
| 6,389,420 B1 | 5/2002 | Vahalia et al. | |
| 6,453,354 B1 | 9/2002 | Jiang et al. | |
| 6,546,457 B1 * | 4/2003 | Don et al. | 711/114 |
| 6,973,455 B1 | 12/2005 | Vahalia et al. | |
| 7,107,385 B2 | 9/2006 | Rajan et al. | |
| 7,383,463 B2 | 6/2008 | Hayden et al. | |
| 7,546,319 B1 | 6/2009 | Srinivasan et al. | |
| 7,549,089 B1 | 6/2009 | Kimmel et al. | |
| 7,552,146 B1 | 6/2009 | Kahn et al. | |
| 7,631,155 B1 | 12/2009 | Bono et al. | |
| 7,694,191 B1 | 4/2010 | Bono et al. | |
| 7,797,404 B1 * | 9/2010 | Knight | 709/220 |
| 8,046,694 B1 * | 10/2011 | Lappas et al. | 715/740 |
| 2005/0015313 A1 * | 1/2005 | Eto | 705/27 |
| 2006/0288026 A1 | 12/2006 | Zayas et al. | |
| 2007/0067256 A1 | 3/2007 | Zayas et al. | |

(Continued)

OTHER PUBLICATIONS

Office.com, Insert a new worksheet, http://office.microsoft.com/en-us/excel-help/insert-a-new-worksheet-HP005200889.aspx?CCT=1, 1 pp.*

(Continued)

*Primary Examiner* — Marc Somers
(74) *Attorney, Agent, or Firm* — Richard Auchterlonie; Novak Druce Connolly Bove + Quigg LLP

(57) ABSTRACT

Environmental information required for configuring a data storage system for using a file mapping protocol is collected and qualified via a spreadsheet used as an input file to a configuration program. The configuration program provides a comparison of the present configuration to the new configuration specified in the spreadsheet, and provides to a system administrator an option of applying or skipping the new configuration for each of multiple classes of configuration objects including iSCSI targets on storage array controllers, file server interfaces for host access to file mapping information, file systems, and iSCSI clients on the host processors. Once the system administrator approves the selected configuration changes, the configuration utility produces a series of control commands for execution by a control command interpreter of a file server in order to change configuration settings in the file server and in the storage array controllers.

11 Claims, 16 Drawing Sheets

(56) References Cited

U.S. PATENT DOCUMENTS

| | | | |
|---|---|---|---|
| 2007/0088702 | A1 | 4/2007 | Fridella et al. |
| 2007/0136548 | A1 | 6/2007 | Mane |
| 2007/0260830 | A1 | 11/2007 | Faibish et al. |
| 2007/0260842 | A1 | 11/2007 | Faibish et al. |
| 2008/0005468 | A1 | 1/2008 | Faibish et al. |
| 2008/0189343 | A1 | 8/2008 | Hyer et al. |
| 2009/0132543 | A1* | 5/2009 | Chatley et al. .......... 707/10 |
| 2010/0031082 | A1* | 2/2010 | Olster .................. 714/7 |

OTHER PUBLICATIONS

Vahalia, Uresh, Unix Internals: The New Frontiers, 1996, p. 261-289, Prentice-Hall, Inc., Upper Saddle River, NJ.

Welch et al., "pNFS Operations draft-welch-pnfs-ops-02.txt", Internet Draft, Jun. 9, 2005. 47 pages, the Internet Society, Reston, VA.

Fridella et al., "Elements of a Scalable Network File System Protocol," NEPS Workshop at the University of Michigan, Ann Arbor, MI, Dec. 4, 2003, position paper (5 pages) and presentation ("Building a Scalable NFS," 13 pages), EMC Corporation, Hopkinton, MA.

EMC Celerra HighRoad, Jan. 2002, 13 pages, EMC Corporation, Hopkinton, MA.

EMC Celerra Multi-Path File System (MPFS). Nov. 2009, 4 pages, EMC Corporation, Hopkinton, MA.

"Achieving Storage Efficiency with EMC Celerra, Best Practices Planning," white paper, May 2009, 20 pages, EMC Corporation, Hopkinton, MA.

"EMC Celerra Unified Storage," data sheet, Jan. 2009, 5 pages, EMC Corporation, Hopkinton, MA.

Deploying Celerra MPFSi in High-Performance Computing Environments, Best Practices Planning, Jun. 2006,19 pages, EMC Corporation, Hopkinton, MA.

"Celerra File Server in the E-Infostructure," white paper, 2000, 12 pages, EMC Corporation, Hopkinton, MA.

"EMC Celerra CNS with CLARiiON Storage," Dec. 2002, data sheet, 6 pages, EMC Corporation, Hopkinton, MA.

"EMC CLARiiON MetaLUNs," white paper, Mar. 2010, 56 pages, pages, EMC Corporation, Hopkinton, MA.

"Using EMC Celerra IP Storage with Citrix XenServer over iSCSI, CIFS, and NFS," white paper, Nov. 2008, 40 pages, EMC Corporation, Hopkinton, MA.

"EMC Navisphere Management Suite," data sheet, Jan. 2004, 7 pages, EMC Corporation, Hopkinton, MA.

"Managing EMC Celerra with Celerra Manager," data sheet, Nov. 2009, 2 pages, EMC Corporation, Hopkinton, MA.

"EMC Navisphere Analyzer Version 6.28.21 Release Notes P/N 300-007-073 REV A05," Jun. 15, 2009. 18 pages, EMC Corporation, Hopkinton, MA.

"EMC Navisphere Analyzer: A Case Study," May 2001, 14 pages, EMC Corporation, Hopkinton, MA.

"Six approaches to storing more efficiently," Sep. 2009, 11 pages, EMC Corporation, Hopkinton, MA.

"EMC CIARiiON Best Practices for Fibre Channel Storage," Engineering white paper, Mar. 16, 2004.36 pages, EMC Corporation, Hopkinton, MA.

Patterson et al., "Introduction to Redundant Arrays of Inexpensive Disks (RAID)," Feb. 27-Mar. 31, 1989, Spring Compcon 89, San Francisco, pp. 112-117, IEEE Computer Society, New York, NY.

Lam, Terance, "Improving File System Performance by Striping," Mar. 4, 2010, 10 pages, NASA Ames Research Center, Mountain View, CA.

Treadway, Tom, "Picking the right stripe size," Storage Interconnects & RAID, Jun. 6, 2006, 14 pages, Storage Advisors, Adaptec Inc, Santa Clara, CA.

Rashid, Fahmida, "In storage, it's one for all," CRN Tech, Sep. 15, 2007, 3 pages, United Business Media Ltd., London, England.

"EMC CLARiiON CX3 Best Practices for Achieving 'Five 9s' Availability," White paper, Feb. 2007,14 pages, EMC Corporation, Hopkinton, MA.

"EMC Navisphere Management Suite," 2005, 2 pages, Dell Inc., Austin, TX.

"Celerra MPFS Solution Design and Implementation Workshop—MR-1CP-NSMPFSWS," 2010, 2 pages, Nexium, Inc., Chicago, IL.

"Introducing RAID 5 on Symmetrix DMX," EMC White Paper, Jan. 19, 2004, 12 pages, EMC Corporation, Hopkinton, MA.

"EMC Celerra Family Technical Review," 2008, pp. 1-20, EMC Corporation, Hopkinton, MA.

"EMC Celerra Family Technical Review," 2008, pp. 21-40, EMC Corporation, Hopkinton, MA.

"EMC Celerra Family Technical Review," 2008, pp. 41-60, EMC Corporation, Hopkinton, MA.

"EMC Celerra Family Technical Review," 2008, pp. 61-83, EMC Corporation, Hopkinton, MA.

"EMC Navisphere Manager Version 5.X Administrator's Guide P/N 069001143 REV A01," Mar. 2002, pp. 1-51, EMC Corporation, Hopkinton, MA.

"EMC Navisphere Manager Version 5.X Administrator's Guide P/N 069001143 REV A01," Mar. 2002, pp. 51-100, EMC Corporation, Hopkinton, MA.

"EMC Navisphere Manager Version 5.X Administrator's Guide P/N 069001143 REV A01," Mar. 2002, pp. 101-150, EMC Corporation, Hopkinton, MA.

"EMC Navisphere Manager Version 5.X Administrator's Guide P/N 069001143 REV A01," Mar. 2002, pp. 151-200, EMC Corporation, Hopkinton, MA.

"EMC Navisphere Manager Version 5.X Administrator's Guide P/N 069001143 REV A01," Mar. 2002, pp. 201-250, EMC Corporation, Hopkinton, MA.

"EMC Navisphere Manager Version 5.X Administrator's Guide P/N 069001143 REV A01," Mar. 2002, pp. 251-300, EMCc Corporation, Hopkinton, MA.

"EMC Navisphere Manager Version 5.X Administrator's Guide P/N 069001143 REV A01," Mar. 2002, pp. 301-350, EMC Corporation, Hopkinton, MA.

"EMC Navisphere Manager Version 5.X Administrator's Guide P/N 069001143 REV A01," Mar. 2002, pp. 351-408 pages, EMC Corporation, Hopkinton, MA.

"Simple, Inexpensive Oracle Recovery Manager Backups on EMC Celerra MPFS," white paper, Jan. 2009, 19 pages, EMC Corporation, Hopkinton, MA.

Griffin, Hugh, "How to Modify the SP IP Addresses for an EMC Celerra (NS Proxy ARP Implementation)," Jul. 15, 2009, 6 pages, whughgriffen blog at wordpress.com.

"Managing Dell NX4 With Celerra Manager," data sheet, downloaded Feb. 12, 2010, 2 pages, Dell Corporation, Austin, TX.

"Install the ISA Configuration Storage Server and Configure the Firewall Array," Microsoft TechNet, down-loaded Feb. 17, 2010, 2 pages, Microsoft Corporation, Redmond, WA.

"Enterprise Deployment," Microsoft TechNet, down-loaded Feb. 17, 2010, 5 pages, Microsoft Corporation, Redmond, WA.

* cited by examiner

| MAPPING INFO. IN THE FILE SERVER | | | | | 39 |
|---|---|---|---|---|---|
| LOGICAL VOLUME ID (iSCSI LUN) | PRIMARY NODE OR SERVER | INDICATED STORAGE SERVER (IP ADDR.) | SIZE AND OTHER ATTRIBUTES (E.G., CLIENT ACCESS GROUPS) | LOGICAL-TO-PHYSICAL MAPPING |
| ≡ | ≡ | ≡ | ≡ | ≡ |

|   | A | B | C | D | E | F | G | H | I | J | K | L | M | N | O | P |
|---|---|---|---|---|---|---|---|---|---|---|---|---|---|---|---|---|
| 1 | | | | | | | | | | | | | | | | |
| 2 | | | FMP CONFIGURATION UTILITY INPUT FILE | | | | | | | | | | | | | |
| 3 | | | Welcome to the FMP Configuration Utility Input File | | | | | | | | | | | | | |
| 4 | | | | | | | | | | | | | | | | |
| 5 | | | Populate the tabs below with information specific to the site targeted for FMP. Entering configuration | | | | | | | | | | | | | |
| 6 | | | data in this workbook will enable the FMP Configuration tool to read that data in, and apply it to the | | | | | | | | | | | | | |
| 7 | | | file server. Please take a moment to familiarize yourself with what is expected on each tab. | | | | | | | | | | | | | |
| 8 | | | | | | | | | | | | | | | | |
| 9 | | | Control Station: This tab has the Control Station IP Address, and the User name of the file server | | | | | | | | | | | | | |
| 10 | | | Administrator account (default is nasadmin). | | | | | | | | | | | | | |
| 11 | | | | | | | | | | | | | | | | |
| 12 | | | iSCSI Port: This tab contains the data required to define the iSCSI ports on the storage array. | | | | | | | | | | | | | |
| 13 | | | | | | | | | | | | | | | | |
| 14 | | | DM Interface: The interfaces on the file server are defined in this tab. | | | | | | | | | | | | | |
| 15 | | | | | | | | | | | | | | | | |
| 16 | | | CIFS Server: CIFS Servers can be defined in this tab. | | | | | | | | | | | | | |
| 17 | | | | | | | | | | | | | | | | |
| 18 | | | File Systems: Enter the name of the Number of drives, their type, the number of buses, | | | | | | | | | | | | | |
| 19 | | | file system name, and the desired export type. | | | | | | | | | | | | | |
| 20 | | | | | | | | | | | | | | | | |
| 21 | | | Client: This is the Fully qualified Domain name of the iSCSI initiator, and the OS Type | | | | | | | | | | | | | |
| 22 | | | | | | | | | | | | | | | | |
| 23 | | | Please do not alter the header row. Please do not insert columns into the workspaces. | | | | | | | | | | | | | |
| 24 | | | The tool requires the positional data of the header to import. | | | | | | | | | | | | | |

\ WELCOME \ CONTROL_STATION \ SCSI_PORT \ DM_INTERFACE \ CIFS_SERVER \ FILESYSTEMS \ CLIENT \

| | A | B | C |
|---|---|---|---|
| 1 | ControlStation IP | AdministratorName | |
| 2 | 10.38.2.45 | root | |
| 3 | | | |

| | A | B | C | D | E |
|---|---|---|---|---|---|
| 1 | SP: | Port ID: | IP Address: | Subnet Mask: | Gateway Address: |
| 2 | A | 4 | 45.252.3.107 | 255.255.255.0 | 45.252.3.1 |
| 3 | A | 5 | 45.252.3.108 | 255.255.255.0 | 45.252.3.1 |
| 4 | A | 6 | 45.252.3.109 | 255.255.255.0 | 45.252.3.1 |
| 5 | A | 7 | 45.252.3.110 | 255.255.255.0 | 45.252.3.1 |
| 6 | A | 8 | 45.252.3.111 | 255.255.255.0 | 45.252.3.1 |
| 7 | A | 9 | 45.252.3.112 | 255.255.255.0 | 45.252.3.1 |
| 8 | B | 4 | 45.252.3.113 | 255.255.255.0 | 45.252.3.1 |
| 9 | B | 5 | 45.252.3.114 | 255.255.255.0 | 45.252.3.1 |
| 10 | B | 6 | 45.252.3.115 | 255.255.255.0 | 45.252.3.1 |
| 11 | B | 7 | 45.252.3.116 | 255.255.255.0 | 45.252.3.1 |
| 12 | B | 8 | 45.252.3.117 | 255.255.255.0 | 45.252.3.1 |
| 13 | B | 9 | 45.252.3.118 | 255.255.255.0 | 45.252.3.1 |

| | A | B | C | D | E | F | G |
|---|---|---|---|---|---|---|---|
| 1 | Dm InterfaceName | Interface IP | Mask | GW | Broadcast | Int_vtype | Interface Port |
| 2 | id1rpt115s2 | 10.6.116.231 | 255.255.255.0 | 10.6.116.1 | 10.6.116.255 | LACP | cge0,cge1 |
| 3 | ie1rpt115s2 | 10.6.117.231 | 255.255.255.0 | 10.6.117.1 | 10.6.117.255 | LACP | cge2,cge3 |
| 4 | | | | | | | |
| 5 | | | | | | | |
| 6 | | | | | | | |

FIG. 17

| | A | B | C | D |
|---|---|---|---|---|
| 1 | CIFS ServerName | Domain | CIFS Admin | |
| 2 | fileserver1 | solution1.rtp.dg.com | Administrator | |
| 3 | fileserver3 | solution1.rtp.dg.com | Administrator | |
| 4 | fileserver4 | solution1.rtp.dg.com | Administrator | |
| 5 | | | | |
| 6 | | | | |

226

| | A | B | C | D | E |
|---|---|---|---|---|---|
| 1 | FS Physical Disk Count | Disk Type | FS Bus Count | FS Name | ExportType |
| 2 | 20 | FC | 2 | mpfsfs01 | NFS |
| 3 | 20 | FC | 2 | mpfsfs02 | NFS |
| 4 | 20 | FC | 2 | mpfsfs03 | NFS |
| 5 | | | | | |
| 6 | | | | | |

| | A | B |
|---|---|---|
| 1 | iSCSI Client FQDN | OS |
| 2 | Mpfso1.mpfsbox.com | Windows |
| 3 | Mpfso1.mpfsbox.com | Windows |
| 4 | Mpfso1.mpfsbox.com | Windows |
| 5 | Mpfso1.mpfsbox.com | Windows |
| 6 | Mpfso1.mpfsbox.com | Windows |

FIG. 19

CONFIGURATION UTILITY FOR A DATA STORAGE SYSTEM USING A FILE MAPPING PROTOCOL FOR ACCESS TO DISTRIBUTED FILE SYSTEMS

LIMITED COPYRIGHT WAIVER

A portion of the disclosure of this patent document contains spread sheet formats and graphical user interface (GUI) screen formats and control command sequences to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

FIELD OF THE INVENTION

The present invention relates to configuration of a data storage system using a file mapping protocol for access to distributed file systems.

BACKGROUND OF THE INVENTION

For high-performance parallel processing, it is desired for host processors to access shared data at a higher level of abstraction than disk blocks in order to use conventional techniques for storage allocation and maintenance of coherency. In this fashion, the application programming for the parallel processor system can be independent of the hardware implementation. This provides for not only software portability but also incremental upgrading of the shared memory and storage. At present this objective is achieved in advanced data storage systems by using a file mapping protocol (FMP) for access to distributed file systems.

A file mapping protocol (FMP) provides host processors with the ability to perform read and write operations that go directly from the host processor to individual storage elements in a data storage array without funneling all of the read and write operations through a single file server. Instead, the host processor has an FMP client that first obtains file mapping metadata from a metadata file server. The file mapping metadata maps data blocks in the extent of a file to logical blocks of storage in a data storage array. Then the FMP client uses the file mapping metadata to formulate read and write block access requests sent to the storage array for access to logical blocks of file data in the storage array.

Various aspects of a preferred FMP are described in Xu et al. U.S. Pat. No. 6,324,581 issued Nov. 27, 2001; Vahalia et al. U.S. Pat. No. 6,389,420 issued May 14, 2002; Jiang et al. U.S. Pat. No. 6,453,354 issued Sep. 17, 2002; and Vahalia et al. U.S. Pat. No. 6,973,455 issued Dec. 6, 2005; all of which are incorporated herein by reference. An industry-standard version of FMP is described in the Internet Draft by Welch et al. entitled "pNFS Operations draft-welch-pnfs-ops-02.txt" dated Jun. 9, 2005.

In a preferred FMP protocol, the client sends to the metadata server a "get_mapping" request, an "allocate_block" request, and a "commit_block" request. In addition, a client may send an initial "volume-discovery" request in order to discover shared storage objects or files for a specified namespace or file system.

The following is an example of using the preferred FMP requests for reading data. In a host processor, a local application sends a file read request to a FMP client. The FMP client in the host processor sends a "get_mapping" request to a metadata server. The metadata server reads the file mapping, and returns a reply to the FMP client. The FMP client uses the file mapping to read file data from storage, and then the FMP client returns the file data to the local application. For subsequent reads, the FMP client may use cached data or cached mappings.

The following is an example of using the preferred FMP requests for writing data. In a host processor, a local application sends a file write request to the FMP client. The FMP client in the host processor sends an "alloc_block" request to the metadata server. The metadata server pre-allocates storage blocks, and returns a reply to the FMP client. The FMP client returns a reply to the local application, and writes the cached file data to the pre-allocated blocks in storage. Then the FMP client sends a "commit_block" request the metadata server. The metadata server responds by adding the blocks to the file mapping. For subsequent writes, the FMP client may use cached pre-allocated blocks.

Configuration of a data storage system using a file mapping protocol for access to distributed file systems has been problematic because configuration of the data storage system requires coordination between configuration of host processors, at least one metadata file server, and a storage array controller for at least one back-end data storage array. Information required for host set-up, file server set-up, and storage array set-up was collected and programmed into the host processors, file server, and storage array controller, using a combination of manual and semi-automated techniques. The manual steps involved a high risk of human error, so that a systems administrator needed a high level of skill and experience to perform the system configuration task. In the absence of human error, there still was a significant risk of inconsistency among the host set-up, the file system set-up, and the storage array controller set-up. Many hours were required for set-up and validation of an end-to-end solution.

For example, a relatively simple data storage system using a file mapping protocol may include a host processor, an EMC Corporation CELERRA® brand file server, and an EMC Corporation CLARIION® brand data storage array. In this case the host processor is linked to the file server via an IP network, and the host processor and the file server are linked to the data storage array via a storage array network (SAN). A FMP client is installed on the host processor. A distributed file system is set up on the file server, and storage for the distributed file system is set up on the data storage array. The file server is set up so that the FMP client on the host has permission to access metadata of the distributed file system through the file server, and the data storage array is set up so that the FMP client has permission to access the storage for the distributed file system on the data storage array.

Configuration of an EMC Corporation CELERRA® brand file server has involved use of an installation wizard, a management console, and add-on management tools, which are included on a software CD that is shipped with the file server. The installation wizard will auto-detect a host processor on the network, configure the system for the network and perform a cable connectivity and health check, and create a root and sysadmin account. The installation wizard presents seven screens of configuration options. The configuration options are also listed on a worksheet that accompanies the CD. At the end of this initial set-up and configuration, the installation wizard offers to open up one of three optional configuration wizards for creating NFS exports, iSCSI LUNs or CIFS shares. The management console provides options for changing the initial configuration. The options of the management console include network configuration, hardware configuration, and management of X-blades, file systems, shares, checkpoints, and quotas for users, groups, and trees. The management console also displays status and usage information.

Configuration of an EMC Corporation CLARIION® brand data storage array has involved an EMC Corporation NAVISPHERE brand storage management utility. The storage management utility provides automatic or manual configuration of RAID groups, then LUNs can be created from these RAID groups. System administrators can also LUN mask and control data access across multiple heterogeneous hosts in distributed SANs.

SUMMARY OF THE INVENTION

In accordance with one aspect, the invention provides a computer-implemented method of at least one data processor executing instructions of a configuration program in memory to configure a data processing system for using a file mapping protocol. The data processing system includes at least one file server, at least one storage array controller controlling access to at least one data storage array, and at least one host processor. The configuring of the data processing system enables the at least one host processor to use the file mapping protocol for obtaining file mapping information from the at least one file server, formulating storage block access commands from the file mapping information, and accessing data storage by sending the storage block access commands to the at least one storage array controller. The method includes receiving configuration information specifying new configuration objects used in the file mapping protocol. The new configuration objects include storage array controller interfaces for receiving the storage block access commands from the at least one host processor, file server interfaces for providing the file mapping information to the at least one host processor, file systems built on the data storage, and host processor interfaces for sending the storage block access commands to the at least one storage array controller. The method further includes producing control commands from the configuration information specifying the new configuration objects used in the file mapping protocol. The control commands are executable to change configuration settings in the at least one file server and in the at least one storage array controller to configure the data processing system for using the file mapping protocol.

In accordance with another aspect, the invention provides a method of configuring a data processing system for using a file mapping protocol. The data processing system includes at least one file server, at least one storage array controller controlling access to at least one data storage array, and at least one host processor. The configuring of the data processing system enables the at least one host processor to use the file mapping protocol for obtaining file mapping information from the at least one file server, formulating storage block access commands from the file mapping information, and accessing data storage by sending the storage block access commands to the at least one storage array controller. The method includes inserting, into a spreadsheet, configuration information specifying new configuration objects for multiple classes of configuration objects used in the file mapping protocol. The multiple classes of configuration objects include a storage array controller interface class of storage array controller interfaces for receiving the storage block access commands from the at least one host processor, a file server interface class of file server interfaces for providing the file mapping information to the at least one host processor, a file systems class of file systems built on the data storage, and a host processor interface class of host processor interfaces for sending the storage block access commands to the at least one storage array controller. The method further includes displaying to a systems administrator a present configuration of each of the multiple classes of configuration objects, and for each of the multiple classes of configuration objects, presenting to the systems administrator the new configuration objects and an option of either applying the new configuration objects or skipping the new configuration objects, and once the systems administrator has chosen to either apply or skip the new configuration objects of each of the multiple classes of configuration objects, presenting to the systems administrator a summary indicating whether the systems administrator has chosen to either apply or skip the new configuration objects of each of the multiple classes of configuration objects, and presenting to the systems administrator an option to produce control commands from the configuration information specifying the new configuration objects in the classes of configuration objects that are not chosen to be skipped. The method further includes, once the system administrator has chosen to produce control commands from the configuration information specifying the new configuration objects in the classes of configuration objects that are not chosen to be skipped, producing control commands from the configuration information specifying the new configuration objects in the classes of configuration objects that are not chosen to be skipped. The method further includes executing the control commands produced from the configuration information specifying the new configuration objects in the classes of configuration objects that are not chosen to be skipped in order to change configuration settings in the at least one file server and in the at least one storage array controller to configure the data processing system so that the file mapping protocol uses the new configuration objects in the classes of configuration objects that are not chosen to be skipped.

In accordance with a final aspect, the invention provides a data processing system. The data processing system includes at least one file server, at least one storage array controller controlling access to at least one data storage array, at least one host processor, and at least one control station computer including a memory and a configuration program in the memory. The configuration program is executable by the control station computer to configure the at least one file server and the at least one storage array controller to enable the at least one host processor to use a file mapping protocol for obtaining file mapping information from the at least one file server, formulating storage block access commands from the file mapping information, and accessing data storage by sending the storage block access commands to the at least one storage array controller. The configuration program is executable by the control station computer to receive configuration information specifying new configuration objects used in the file mapping protocol. The new configuration objects include storage array controller interfaces for receiving the storage block access commands from the at least one host processor, file server interfaces for providing the file mapping information to the at least one host processor, file systems built on the data storage, and host processor interfaces for sending the storage block access commands from the at least one host processor to the at least one storage array controller. The configuration program is executable by the control station computer for producing control commands from the configuration information specifying the new configuration objects used in the file mapping protocol. The control commands are executable by a command interpreter in the at least one file server to change configuration settings in the at least one file server and in the at least one storage array controller to configure the data processing system for using the file mapping protocol.

BRIEF DESCRIPTION OF THE DRAWINGS

Additional features and advantages of the invention will be described below with reference to the drawings, in which:

FIG. 13 is a "Welcome" page of a spreadsheet used as an input file for the file mapping protocol configuration utility;

FIG. 14 shows a matrix of data found on a "Control Station" page of the spreadsheet of FIG. 13;

FIG. 15 shows a matrix of data found on a "SCSI Port" page of the spreadsheet of FIG. 13;

FIG. 16 shows a matrix of data found on a "DM Interface" page of the spreadsheet of FIG. 13;

FIG. 17 shows a matrix of data found on a "CIFS Server" page of the spreadsheet of FIG. 13;

FIG. 18 shows a matrix of data found on a "File System" page of the spreadsheet of FIG. 13;

FIG. 19 shows a matrix of data found on a "Client" page of the spreadsheet of FIG. 13;

Figure 1:
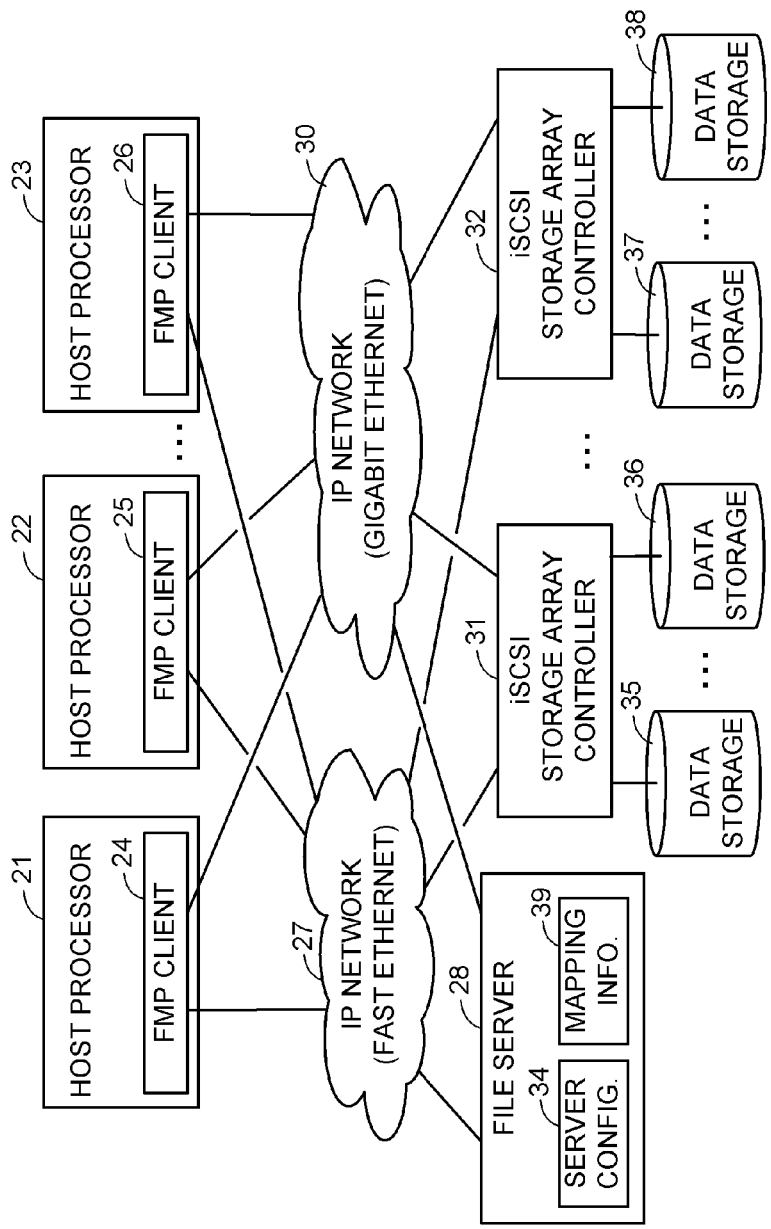
FIG. 1 is block diagram of a data processing system using a file mapping protocol for host processor access to metadata in a file server and host processor access to file data in a number of data storage arrays.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

FIG. 1 shows a data processing system including multiple host processors 21, 22, 23 sharing access to a file server 28 and multiple iSCSI storage array controllers 31, 32. Each host processor 21, 22, 23 is programmed to access storage using a file mapping protocol (FMP) such as the pNFS protocol. In particular, each host processor 21, 22, 23 is programmed with a respective FMP client 24, 25, 26 for accessing metadata of a file system including a file to be accessed, and then using the metadata for accessing data of the file using the iSCSI protocol. The file, for example, is a file in a hierarchical UNIX-based file system, or the file is simply a logical unit number (LUN) of storage made accessible to a host processor.

A fast Ethernet IP network 27 links the FMP clients to a file server 28 for accessing file metadata. A Gigabit Ethernet (GbE) IP network 30 links the FMP clients to a cluster of iSCSI storage array controllers 31, 32 providing iSCSI access to data storage devices 35, 36, 37, 38 of the storage array controllers 32, 32. Preferably all of the network links in FIG. 1 are dual-redundant links, and the file server 28 and the storage array controllers 31, 32 have dual redundant architectures so that the system can continue processing without interruption if there is a single failure of any network link, network port, or processor. For example, the file server 28 is an EMC Corporation CELERRA® brand file server, and the storage array controllers and their associated data storage devices are EMC Corporation CLARIION® brand data storage arrays.

The file server 28 maintains mapping information 39 about allocated logical volume ID numbers corresponding to iSCSI LUNs. The file server 28 also maintains server configuration information 34 about the file server 28 and about the storage array controllers 31, 32 and the data storage devices 35, 36, 37, 38 and the FMP clients 24, 25, 26 having access to the data storage devices through the storage array controllers. Each of the storage array controllers 31, 32 may service any of the FMP clients 24, 25, 26 for access to any of their respective data storage devices 35, 36, 37, 38 provided that the storage array controllers 31, 32 have been configured to grant access of the FMP clients 24, 25, 26 to the particular LUNs of storage to be accessed.

Figures 2, 5:
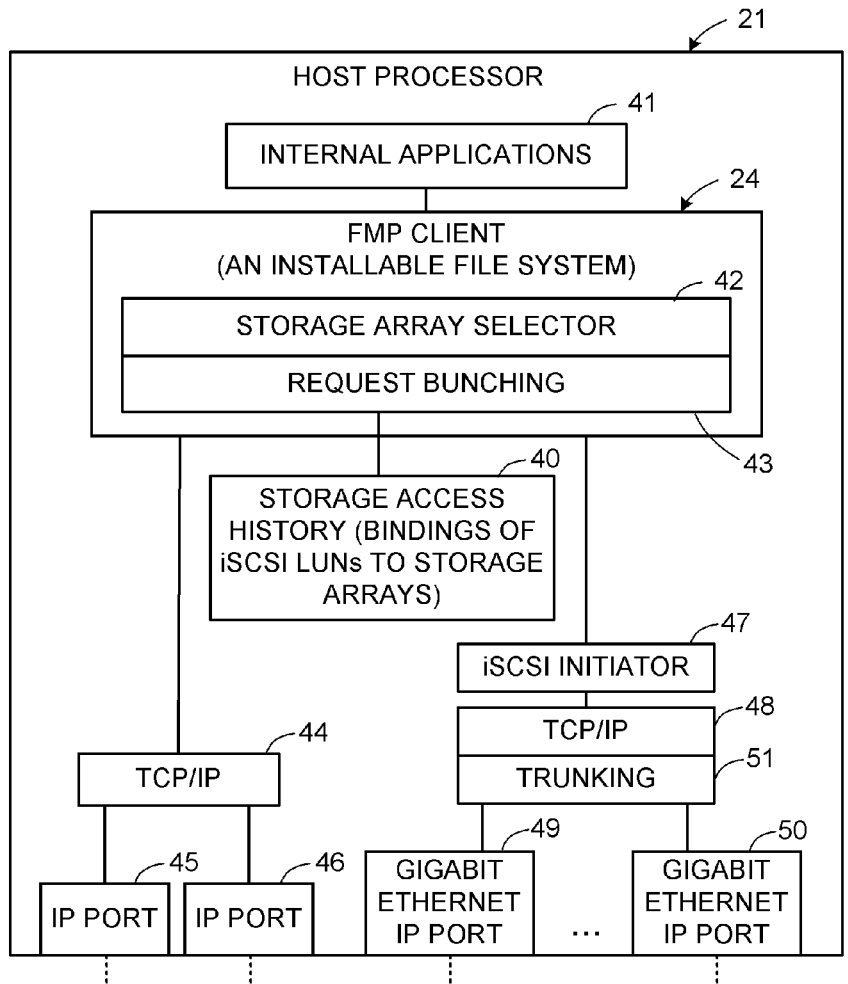
FIG. 2 is a block diagram of one of the host processors introduced in FIG. 1.
FIG. 5 is a block diagram of file mapping information stored in the file server of FIG. 1.

FIG. 2 shows one of the host processors in the data processing system of FIG. 1. The host processor 21 is programmed with internal applications 41, which may call the FMP client 24 for access to data storage. The FMP client 24 is an installable file system. The FMP client 24 includes a storage array selector 42 and a request bunching module 43. The storage array selector 42 accesses a storage access history 40 including bindings of iSCSI LUNs to storage arrays, as indicated by the file server (28 in FIG. 1) when allocating the iSCSI LUNs to the FMP client 24. Metadata requests are packetized by a TCP/IP process 44 and transmitted by one of two IP ports 45 and 46 to the file server. Data requests are formatted into iSCSI requests by an iSCSI initiator 47 and packetized by a TCP/IP process 48 and transmitted by at least one of a plurality of Gigabit Ethernet ports 49, 50 to an IP address of a selected one of the storage array controllers (31, 32 in FIG. 1).

Figure 3:
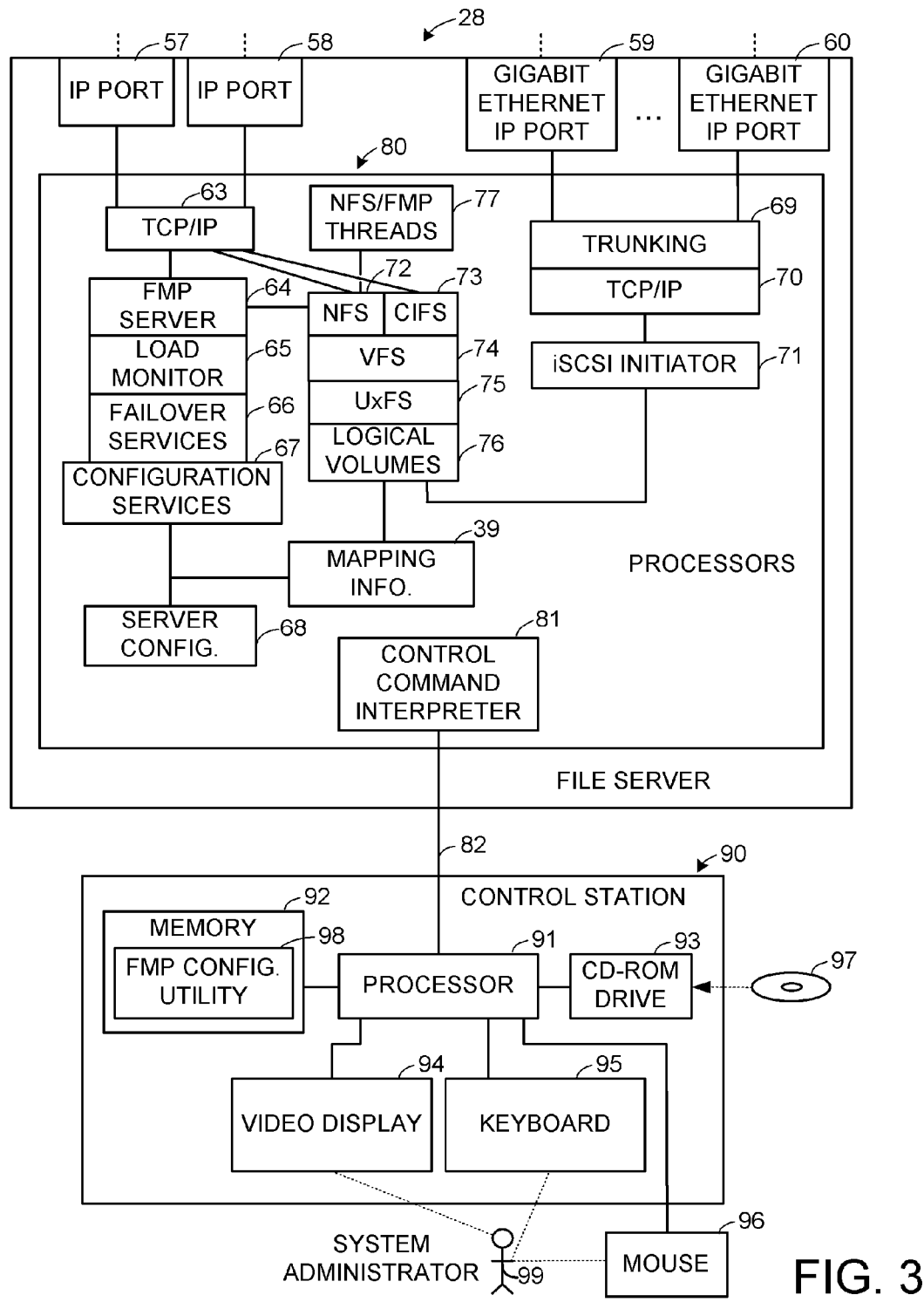
FIG. 3 is a block diagram of the file server introduced in FIG. 1.

FIG. 3 shows details of the file server 28 introduced in FIG. 1. The file server 28 has dual-redundant fast Ethernet IP ports 57, 58, and a plurality of Gigabit Ethernet IP ports 59, 60. At least one of the processors 80 of the file server 28 is programmed with a TCP/IP module 63 for servicing the IP ports 57, 58 and directing FMP requests to a FMP server module 64 and directing NFS requests to an NFS module 72. The FMP server module 64 has an associated load monitor module 65, a failover services module 66, and a configuration services module 67. The FMP server module 64 also uses lower-level functions of the NFS module 72, a Virtual File System (VFS) module 74, and a Unix-based file system module (UxFS) 75.

The NFS module 72 may also service NFS clients that do not use FMP, such as NFS clients that use NFS-V4. In addition, a Common Internet File System (CIFS) module 73 is included to service CIFS clients, such as host processors that use the Microsoft WINDOWS operating system.

At any given time, the NFS module may be servicing concurrently requests from multiple clients. For this purpose, the NFS module 72 uses multi-threaded programming techniques, and maintains a certain number of client service thread instances 77 available for servicing the NFS/FMP requests.

UNIX-based file systems managed by the UxFS module 75 are based on logical volumes managed by a logical volumes manager 76. Each logical volume is comprised of storage of one or more LUNS. The location of the physical storage of each LUN is found in the mapping information 39. The logical volumes module accesses the LUNS through an iSCSI initiator 71. The iSCSI initiator is coupled to the Gigabit Ethernet IP ports 59, 60 through a TCP/IP module 70 and a trunking module 69.

The configuration services 67 maintain a non-volatile copy 68 of configuration information of the file server, and also maintains copies of storage maps and LUN attributes of the storage arrays used as the "back end" storage of the file server. The storage map for each storage array includes LUN and Redundant Array of Inexpensive Disk (RAID) mapping information identifying SAN storage device addresses and specifying RAID mapping for LUNs accessible through the storage array controller. For example, the logical-to-physical mapping for the LUNs can be changed to substitute a mirror or backup copy of a storage volume containing the LUNs for an original storage volume found to be inaccessible or corrupted, or to substitute a new storage volume at the end of a process of migrating the original storage volume to the new storage volume. The LUN attributes also include lists of clients that have permission to use storage array for access to the LUNs.

The file server 28 is configurable and controllable though a control command interpreter 81. For example, a control station 90 is linked to the file server 28 though a dedicated Ethernet cable 82 so that the control command interpreter receives control commands from the control station. The control station 90, for example, is a commodity laptop computer including a processor 91, random access memory 92, CD-ROM drive 93, video display 94, keyboard 95, and a mouse 96.

In order to configure the file server 28, a system administrator 99 loads a CD-ROM 97 into the CD-ROM drive 93, and then selects an FMP configuration utility program on the CD-ROM. The FMP configuration utility program 98 is loaded into the random access memory 92 and then executed by the processor 91. A preferred example of the FMP configuration utility program is described below with reference to FIGS. 8 to 21.

It is also possible to configure the file server 28 so that the control command interpreter 81 is accessible remotely over the IP network 27 in FIG. 1. In this case it could be possible for the system administrator 99 to use any one of the host processors 21, 22, 23 as a control station for executing the FMP configuration utility program.

Figure 4:
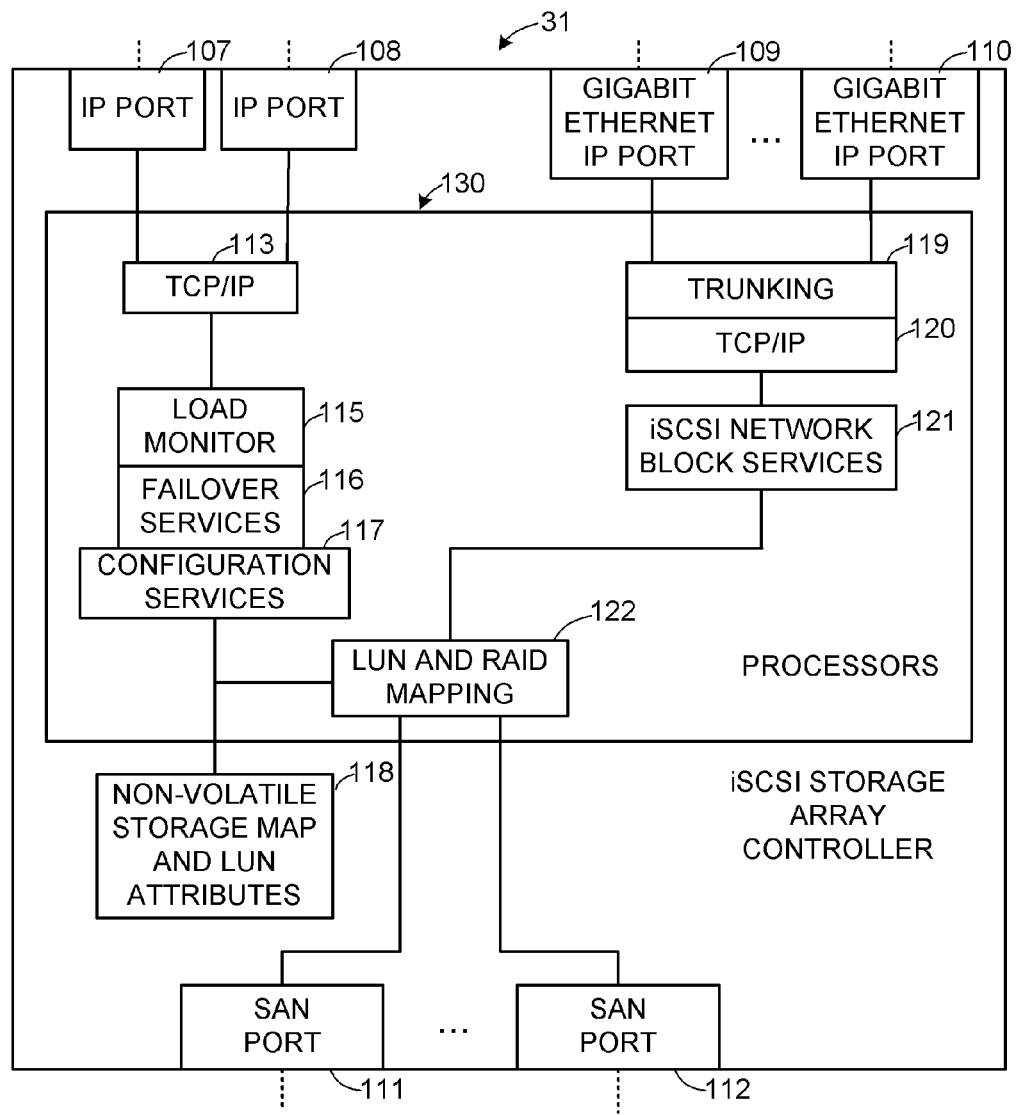
FIG. 4 is a block diagram of one of the data storage array controllers introduced in FIG. 1.

FIG. 4 shows one of the storage array controllers in the data processing system of FIG. 1. The storage array controller 31 has dual-redundant fast Ethernet IP ports 107, 108, a plurality of Gigabit Ethernet IP ports 109, 110, and a plurality of SAN ports 111, 112. At least one of the processors 130 of the storage array controller 31 is programmed with a TCP/IP module 113 for servicing the IP ports 107, 108.

The load monitor 115 determines the percent utilization of the bandwidth of the Gigabit Ethernet IP ports 109, 110 and the percent utilization of the throughput of the SAN ports 111, 112. At periodic intervals or at the request of the file server (28 in FIG. 1), the load monitor 115 reports this utilization to the file server so that the file server may monitor the performance of the data storage array.

The failover services 116 permit the storage array to recover from single link, single processor, or single disk drive failures.

The configuration services 117 maintain a non-volatile copy 118 of a storage map and LUN attributes. The storage map includes LUN and RAID mapping information identifying SAN storage device addresses and specifying RAID mapping for LUNs accessible to the host processors (21, 22, and 23 in FIG. 1) through GbE iSCSI access to the storage array controller 31. For example, the logical-to-physical mapping for the LUNs can be changed to substitute a mirror or backup copy of a storage volume containing the LUNs for an original storage volume found to be inaccessible or corrupted, or to substitute a new storage volume at the end of a process of migrating the original storage volume to the new storage volume. The LUN attributes also include lists of clients that have permission to use the iSCSI storage array controller 31 for access to the LUNs.

At least one of the processors 130 is programmed with a trunking module 119 and a TCP/IP module 120 for servicing the Gigabit Ethernet IP ports 109, 110. iSCSI requests from the Gigabit Ethernet IP ports 109, 110 are passed on to an iSCSI network block services module 121. iSCSI I/O requests are serviced by using the LUN and RAID mapping module 122 to map LUNs to SAN addresses and to translate the iSCSI I/O requests into SAN I/O requests sent to the SAN via the SAN ports 111, 112.

FIG. 5 shows the mapping information 39 in the file server (28 of FIG. 1). This mapping information 39 includes a table or index of allocated logical volume ID numbers corresponding to iSCSI LUNs. Each logical volume is associated with a particular host processor or file server that requested the logical volume to be allocated. This host processor or file server is primary with respect to management of metadata of the logical volume and file systems contained within or striped across the logical volume. Other host processors or file servers may access the logical volume or the file systems contained within or striped across the logical volume, but the other host processors or file servers must have permission from the primary host processor or file server for accessing the logical volume. The file server, for example, can be primary with respect to files shared among the host processors. The logical volume is also associated with an IP address of one of the storage array controllers indicated as the storage array controller that should be used for accessing the logical volume. Each logical volume also has attributes such as a size in bytes, a creation time, and client access groups for LUN masking. Each logical volume also has a logical-to-physical mapping that specifies a physical block address on the storage array for each logical block address in the logical volume.

The FMP server (64 in FIG. 3) provides the FMP clients (24, 25, and 26 in FIG. 1) with the file structure of the files on a file system to be accessed. When a FMP client requests metadata in order to perform an operation on a particular file, the FMP server examines the permissions and access controls associated with the file and sends the FMP client a map of the entire file to be cached locally by the FMP client on its respective host processor. The file map consists of the list of volumes ID, offsets, and block count (a set of adjacent disk blocks or extents) in a run-length form. The FMP client can go to the respective iSCSI storage array controller directly and access the logical blocks as given in the file map.

The FMP clients normally will request the relevant file block map, cache the map in its page buffer cache (common to NFS) and then read the data blocks via iSCSI and cache them locally in a data cache of the respective host processor. The FMP server maintains a communication channel with the FMP client. This FMP connection is validated by successful heartbeats between the FMP server and the FMP client. When the heartbeat fails the FMP client stops any I/O activity and invalidates all of the cached file maps and data blocks. The FMP server manages the access to the file by granting read or write permissions to the FMP clients. Locks govern access permission to each file system block. Each block may be either not locked, locked for write by a single FMP client, or locked for read by one or multiple clients. The FMP server allows multiple writers, so if a block is modified by another client, the FMP server notifies all the FMP clients that have the file open, using an FMP Notify protocol. FMP clients that access the same block range are notified to invalidate their local cache and go back to the FMP server to refresh its locally cached copy of that file map, and go to the respective iSCSI storage array controllers and read the data blocks.

The FMP server (64 in FIG. 3) ensures scalability by performing the metadata management tasks of directory access management and file system block allocation separate from file data access. All the FMP data traffic flows directly between the FMP clients and the iSCSI storage array controllers. Metadata access for some files can occur concurrently with data access of other files, and data access for a file may occur concurrently over multiple iSCSI storage array controllers. Metadata access at one FMP server can support rather continuous and unimpeded data access at up to about nine iSCSI storage array controllers. As a result the number of FMP clients that can be served by the FMP server is an order of magnitude higher that the number of NFS clients that could be served by the same server.

Figure 6:
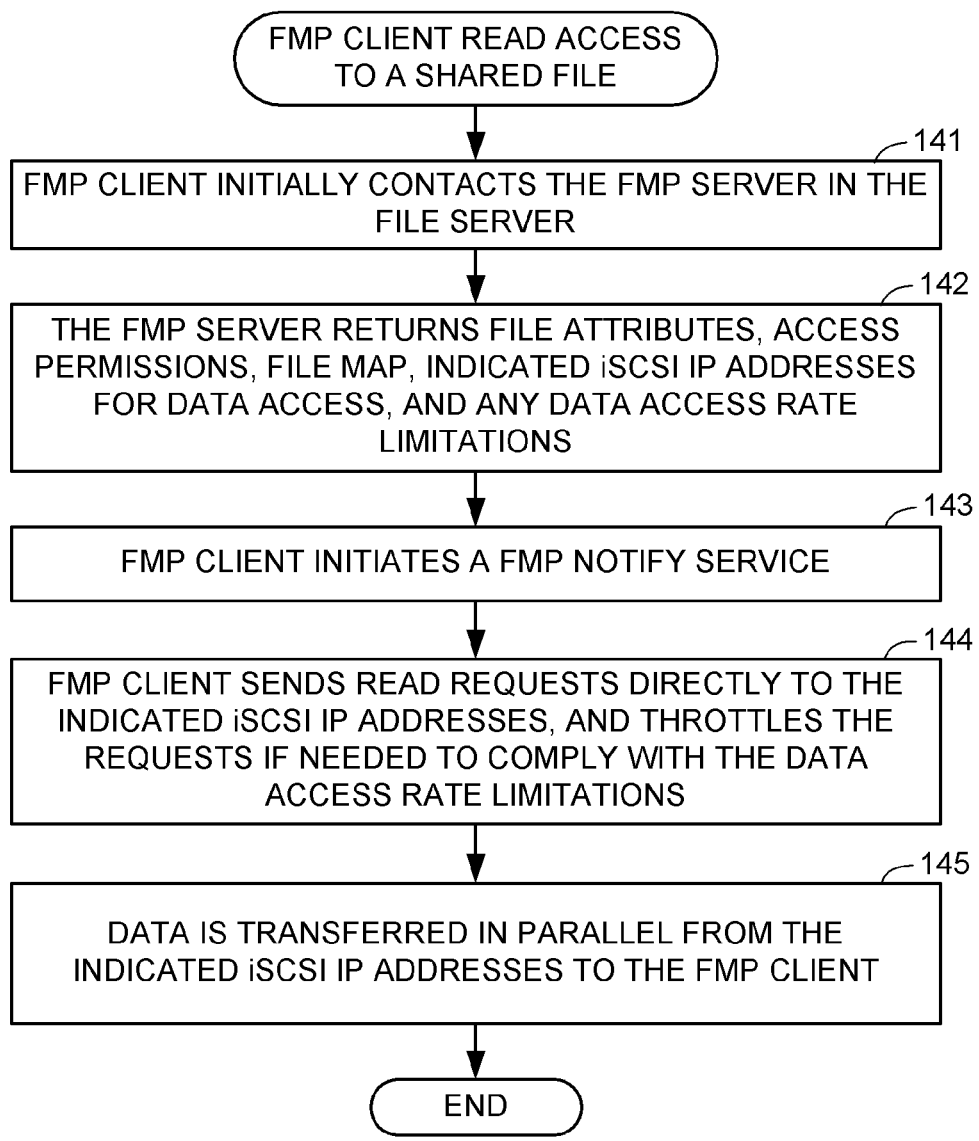
FIG. 6 is a flowchart showing the use of the file mapping protocol for read access to a file shared among the host processors in FIG. 1.

FIG. 6 shows a flowchart of read access by an FMP client to a file managed by the FMP server. In step 141, the FMP client contacts the FMP server. Initially the FMP client software is installed on the host processor, and the FMP client mounts the shared file system and establishes an FMP session with the FMP server. The FMP session is a "two way channel" between the FMP client and the FMP server. The FMP server assigns a unique id to each FMP session, and validates and authenticates the identity of the FMP client via Kerberos or a similar authentication protocol. At mount time the FMP client receives a list of disk volumes where the installable file system is located. The FMP client checks the signature on the volumes to match to the iSCSI storage array controller that it connects to. The FMP client now understands the topology of the file system and data storage network and is able to contact the FMP server in order to request access to a file.

In step 142, the FMP server returns file attributes, access permissions, a file map, indicated iSCSI storage array controllers for data access to the file, and any data access rate limitations. Having received a request for access to a file within a directory in the file system it manages, the FMP server consults its file system structure in its local cache (initially fetched from metadata storage), and returns to the FMP client an FMP file handle and a list of file attributes and access permissions, which authorizes the FMP client to access the specific file and directory, with a specific set of permissions, for a specific length of time. The FMP server also sends, in the same network message, a file map consisting of a list of volume IDs, offsets and extents in run-length form (for increased metadata traffic efficiency), an indication of one or more iSCSI storage array controller IP addresses for data access to the file, and any data access rate limitations. Assuming that the file is large enough, the file will span across multiple 256 KB striped disk volumes, and each volume will be accessed at a respective indicated storage array controller IP address. This gives the client the opportunity to send in parallel multiple 256 KB I/O requests to multiple disk volumes.

In step 143, the FMP client initiates an FMP Notify service. The communication between the FMP client and the FMP server is governed by two co-operating protocols: FMP and FMP/Notify. Each protocol uses its own RPC message stream. The FMP client, who is the service provider for the FMP/Notify protocol, inserts the FMP/Notify service end point ID into the FMP request to the FMP server. The FMP server assigns a session ID and returns it to the FMP client. The FMP server will use the client's FMP/Notify end point ID as the destination end point for the FMP/Notify requests. This allows the FMP server to notify the FMP client when another client is attempting to change the data in that file or portion of the file. When the FMP client receives a notify message, it goes back to the FMP server to renew its access to the file and then updates its local cache from storage. This allows all FMP clients across the system to maintain cache consistency. Because the FMP/Notify service is running on the FMP client, the FMP server just checks for conflicts and sends notifications only in cases of lock conflicts, and not each time a client requests access to the same file. This feature improves the scalability of the metadata server.

In step 144, the FMP client sends read requests directly to the indicated iSCSI storage array controller iSCSI IP addresses, and throttles the requests if needed to comply with any data access rate limitations. The FMP client issues I/O requests to read all or some of the data of the file, whose file block map is in its cache, from the indicated storage array controller IP address.

In step 145, data is transferred in parallel from the indicated storage array controller iSCSI IP addresses to the FMP client. The FMP client sends multiple read I/O requests to multiple disk volumes in parallel. The I/O requests are split to the size of the file system logical volume stripe size and sent to the striped volumes in parallel. For example, the FMP client sends its read request to four storage array controllers simultaneously. Each of the storage array controllers transmits the requested I/Os in parallel, generating approximately 40 MB/s per volume or a potential peak rate of 160 MB/s for this file system configuration (if the client data pipes are wide enough and there is no indicated data access rate limitation).

Figure 7:
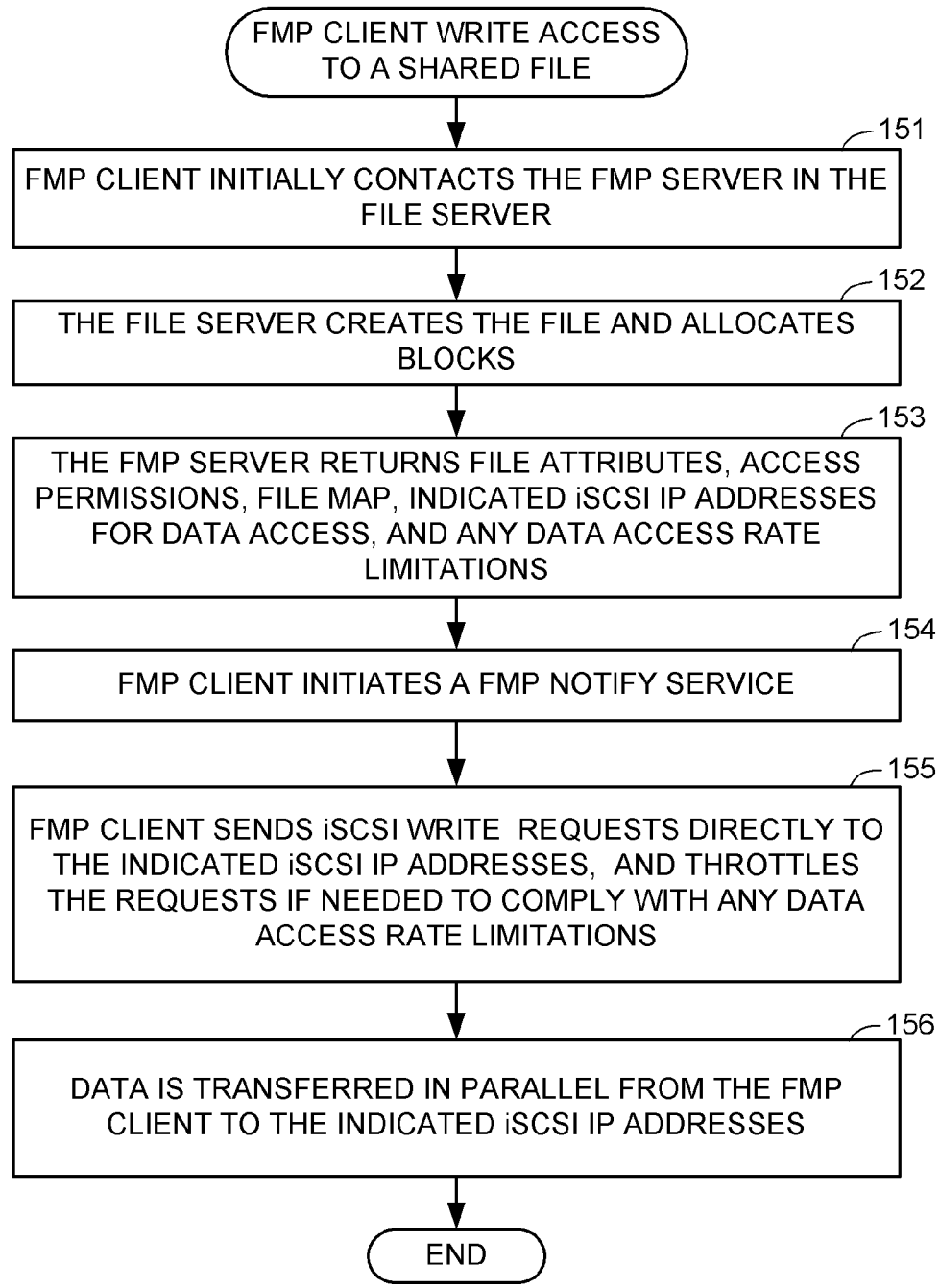
FIG. 7 is a flowchart showing the use of the file mapping protocol for write access to a file shared among the host processors in FIG. 1.

FIG. 7 shows a flowchart of write access by an FMP client to a shared file managed by the FMP server. In a first step 151, the FMP client initially contacts the FMP server. The FMP client is authenticated, as described above for the case of a read (step 141 of FIG. 6). The FMP client makes a request to open a new file for write. The FMP client includes in the request a minimum number of file system blocks to be initially allocated to the file.

In step 152, the FMP server creates the file and allocates blocks. The FMP server creates a new file by allocating a new inode in the file system and setting file attributes as requested by the client. The FMP server keeps a bitmap table of all the free file system blocks and least utilized cylinder groups in the file system. The FMP server allocates file system blocks to the file to achieve sequential disk layout for the file.

In step 153, the FMP server returns file attributes, access permissions, a file map, an indication of one or more storage array controller iSCSI IP addresses for data access, and any data access rate limitations. The FMP server returns to the FMP client a FMP file handle and a list of file attributes and access permissions, which authorizes the FMP client to access the specific file for write operations. The FMP server also sends, in the same network message, the list of blocks allocated to the file consisting in a list of volume IDs, offsets and extents in run-length form (for increased metadata traffic efficiency), one or more storage array controller iSCSI IP addresses for data access, and any data access rate limitations. Assuming that the file is large enough, the file will span across multiple 256 KB striped disk volumes, and each disk volume is to be accessed at an indicated storage array controller iSCSI IP address. This gives the FMP client the opportunity to send in parallel multiple 256 KB I/O requests to multiple disk volumes.

In step 154, the FMP client initiates a FMP Notify service in order to notify the FMP client when another client is attempting to read or write to the same file. When the FMP client receives a notify message, it flushes all the application data from its memory to the indicated iSCSI storage access servers, sends a commit for these blocks to the metadata server, returns to the metadata server all the file blocks that were not committed, and sends a new write request to the metadata server.

In step 155, the FMP client sends read requests directly to the indicated storage array controller iSCSI IP addresses, and throttles the requests if needed to comply with any data access rate limitations. The FMP client packages I/O requests from the local application into an SCSI device buffer of the iSCSI initiator, for each of the logical volumes across which the file system is striped, up to 256K of data on each.

In step 156, data is transferred in parallel from the FMP client to the indicated storage array controller iSCSI IP address. The FMP client sends an iSCSI write command to flush the device buffers to each of the four disk volumes used by the file system on disk in the storage access servers. The FMP client may continue to write data to the storage access servers until it uses all the allocated blocks of the file that it owns. Before the list of allocated blocks is empty, the FMP client may request additional blocks for the file from the FMP server and continue writing.

Figure 8:
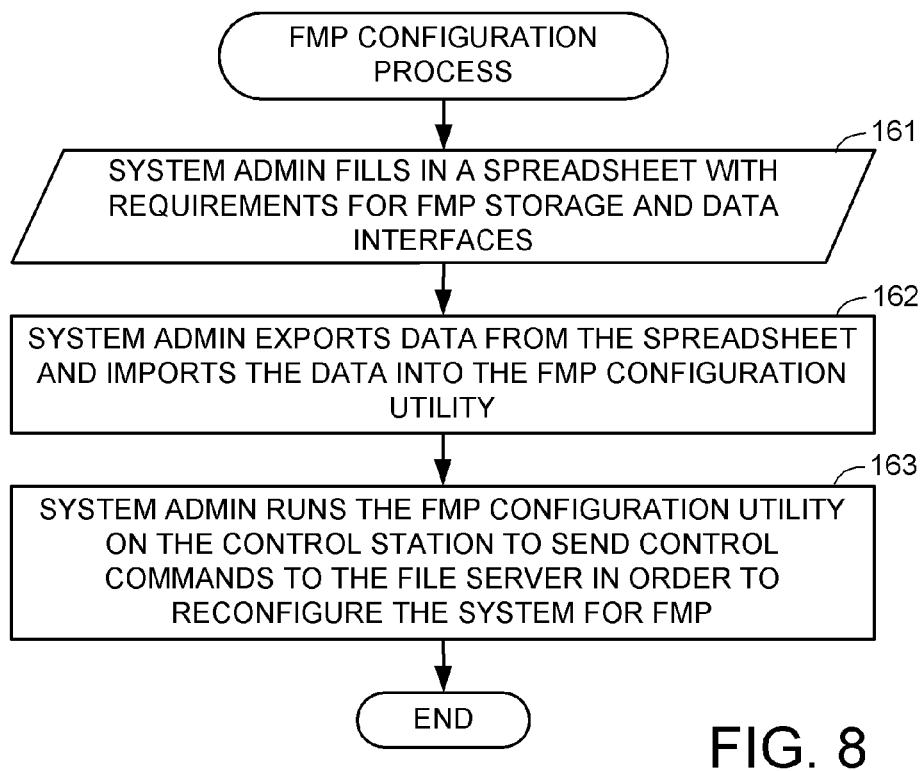
FIG. 8 is a flowchart of a process of configuring the data processing system of FIG. 1 for using the file mapping protocol.

FIG. 8 is a flowchart of a process of configuring the data processing system of FIG. 1 for using the file mapping protocol (FMP). In the typical case, the data processing system is configured for FMP after the file server (28 in FIG. 1) has already been installed and linked to one of the iSCSI storage array controllers (31, 32 in FIG. 1) so that this one of the iSCSI storage array controllers provides back-end storage to the file server. The file server uses this back-end storage for providing storage to CIFS clients and to NFS clients that do not use FMP. The file server will also use this back-end storage for storing a non-volatile copy of the server configuration information (34 in FIG. 1) and the mapping information (39 in FIG. 1) and the directories and file metadata of FMP file systems.

In a first step 161 of FIG. 8, the system administrator fills in a spreadsheet with requirements for FMP storage and data interfaces. Next, in step 162, the system administrator exports the data from the spreadsheet and imports this data into the FMP configuration utility (98 in FIG. 3) while operating the control station (90 in FIG. 3). Then, in step 163, the system administrator runs the FMP configuration utility on the control station to send control commands to the file server in order to reconfigure the system for FMP.

Figure 9:
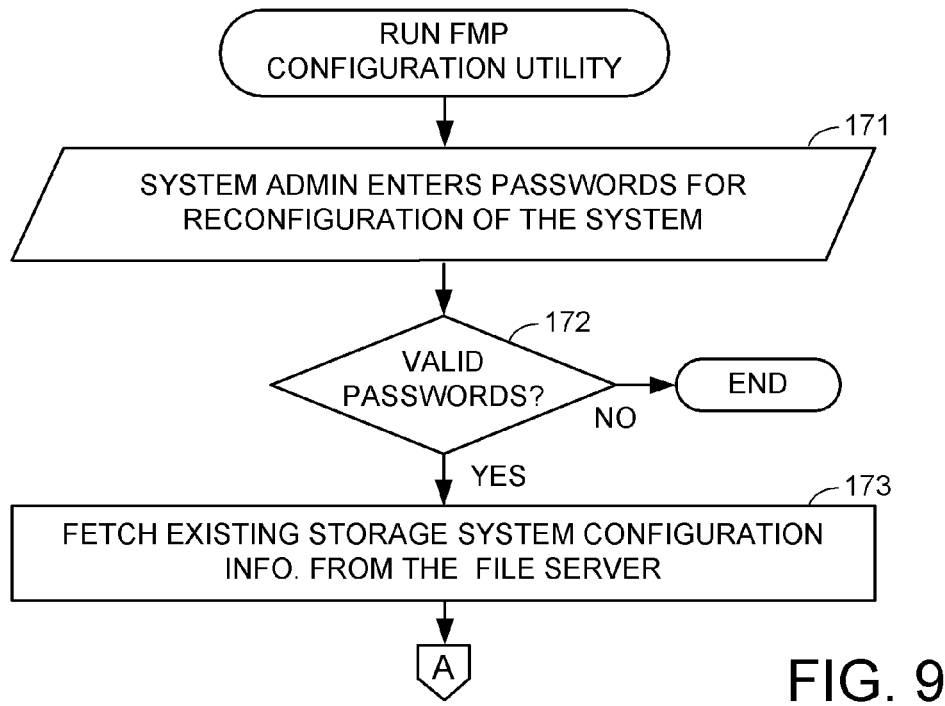
FIGS. 9, 10, and 11 together comprise a flowchart of a file mapping protocol configuration utility program.
Figure 10:
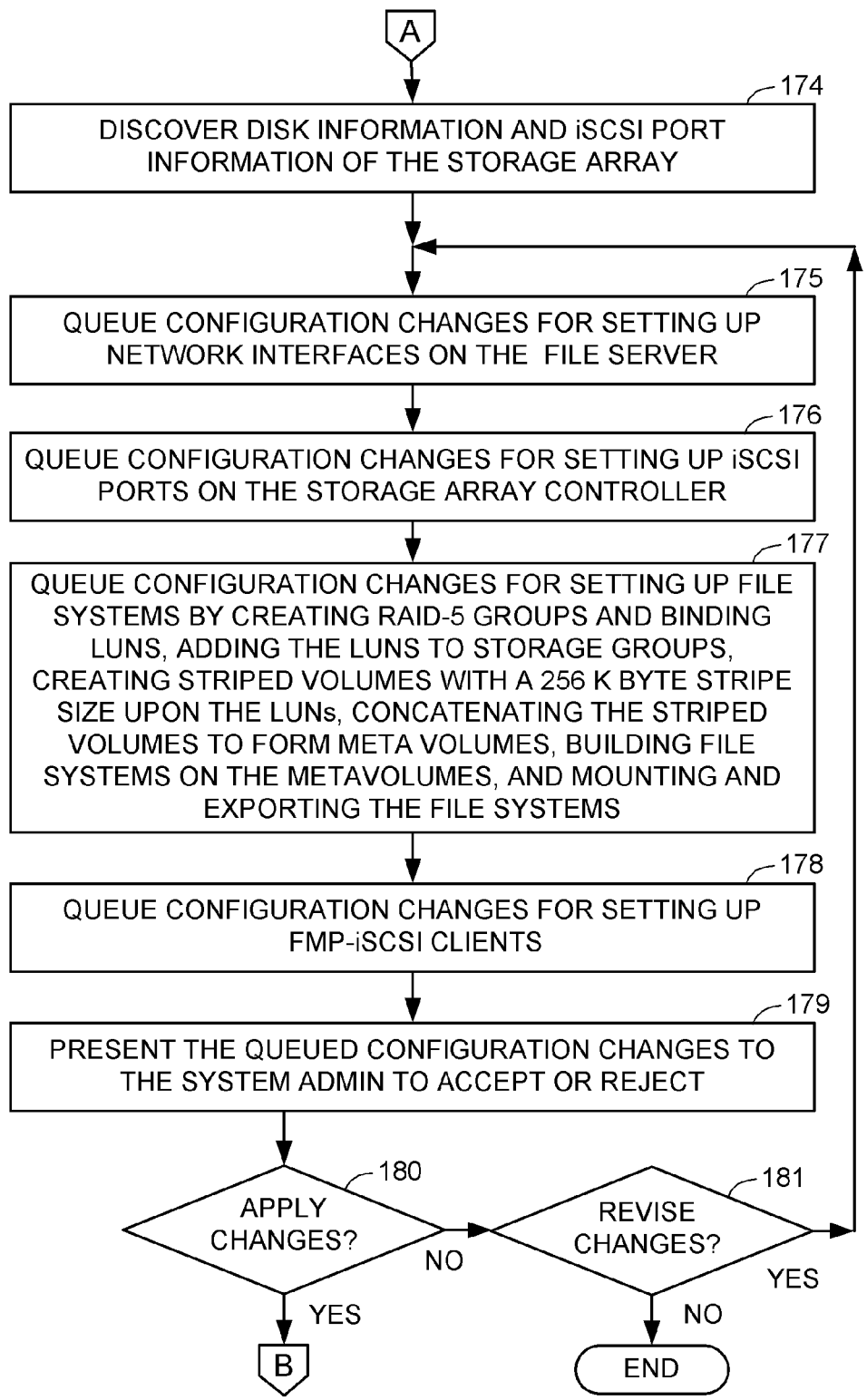
Figure 11:
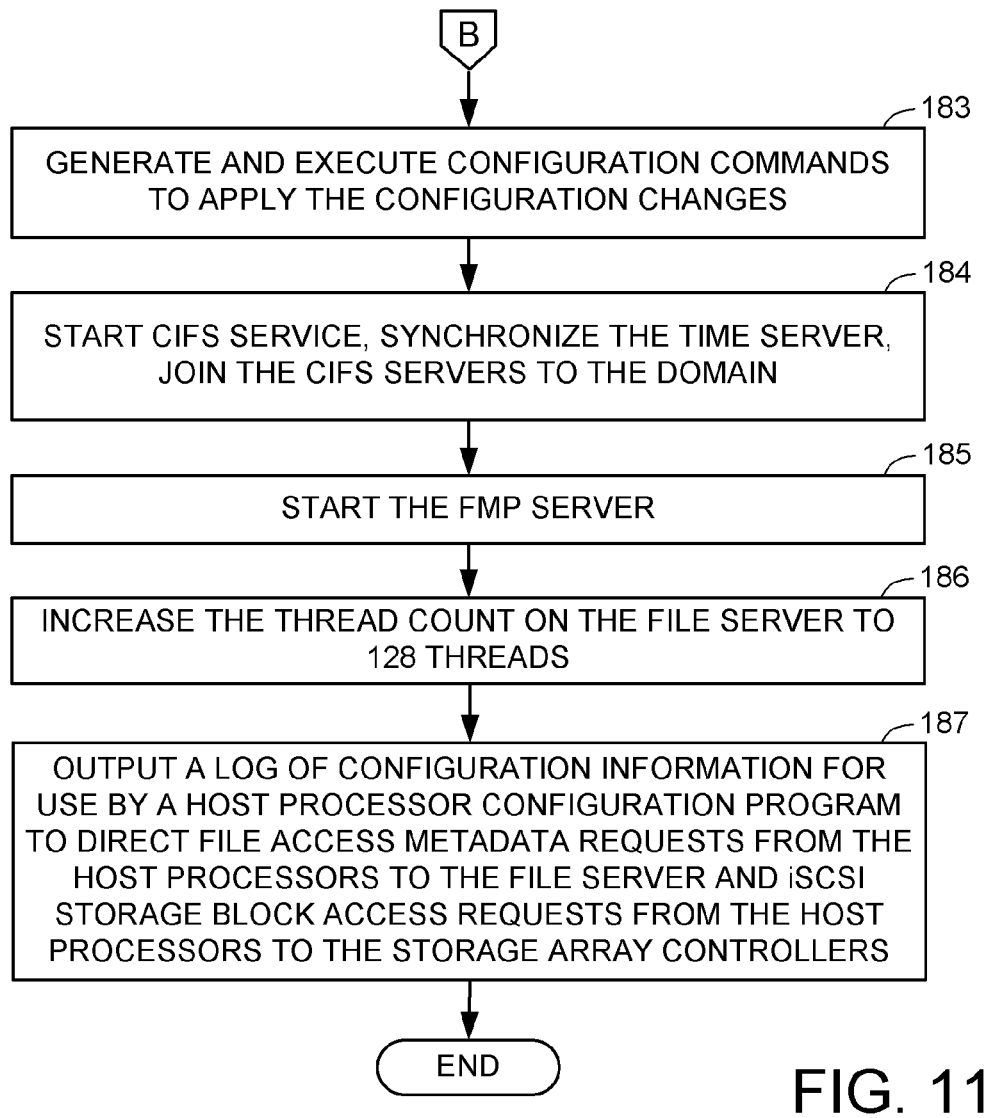

FIGS. 9, 10, and 11 together comprise a flowchart of the file mapping protocol configuration utility (98 in FIG. 3). In a first step 171 in FIG. 9, the system administrator enters passwords for reconfiguration of the system. For example, the passwords include a domain administrator password for authentication and authorization of the system administrator, and a control station root password for access to the configuration files in the file server. In step 172, if the passwords are not valid, then the configuration process is terminated. Otherwise, if the passwords are valid, then execution continues from step 172 to step 173. In step 173, the existing storage system configuration is fetched from the file server. Execution continues from step 173 to step 174 in FIG. 10.

In step 174 of FIG. 10, the disk information and iSCSI port information is discovered from the storage array. In step 175, configuration information changes for setting up network interfaces on the file server are queued. In step 176, configuration information changes for setting up iSCSI ports on the storage array controller are queued.

In step 177, configuration changes for setting up file systems are queued. The file systems are set up by creating RAID-5 groups and binding LUNs, adding the LUNs to storage groups, creating striped volumes with a 256 K byte stripe size upon the LUNs, concatenating the striped volumes to form meta volumes, building file systems on the metavolumes, and mounting and exporting the file systems. An example of file systems set up in accordance with step 177 will be further described below with reference to FIG. 12.

In step 178, configuration changes for setting up FMP-iSCSI clients are queued. In step 179, the queued configuration changes are presented to the system administrator to accept or reject. In step 180, the system administrator is given an opportunity to apply the changes. If the system administrator does not apply the changes, then in step 181 the system administrator may select an option to revise the changes. If the system administrator chooses to revise the changes, then execution loops from step 181 back to any one of steps 175-178. If the system administer does not choose to revise the changes, then execution of the configuration utility terminates.

In step 180, if the system administrator chooses to apply the changes, then execution continues to step 183 in FIG. 11. In step 183, configuration commands are generated from the queued configuration changes, and the configuration changes are executed by the command interpreter of the file server in order to apply the configuration changes. In step 184, the CIFS service is started, and the time server is synchronized, and the CIFS servers are joined to the domain. In step 185, the FMP server is started. In step 186, the thread count on the file server (for servicing FMP and NFS threads) is increased to 128 threads. Finally, in step 187, a log of configuration information is produced for use by a host processor configuration program to direct file access metadata requests from the host processors to the file server and iSCSI storage block access requests from the host processors to the storage array controllers. This log would include, for each of the host processors, identification of the file systems and LUNS that the host processor has permission to access, and for each of these file systems and LUNs, the ports of the file server to be used for access to the file mapping information, and the iSCSI ports of the storage array controllers for access to the file data.

Figure 12:
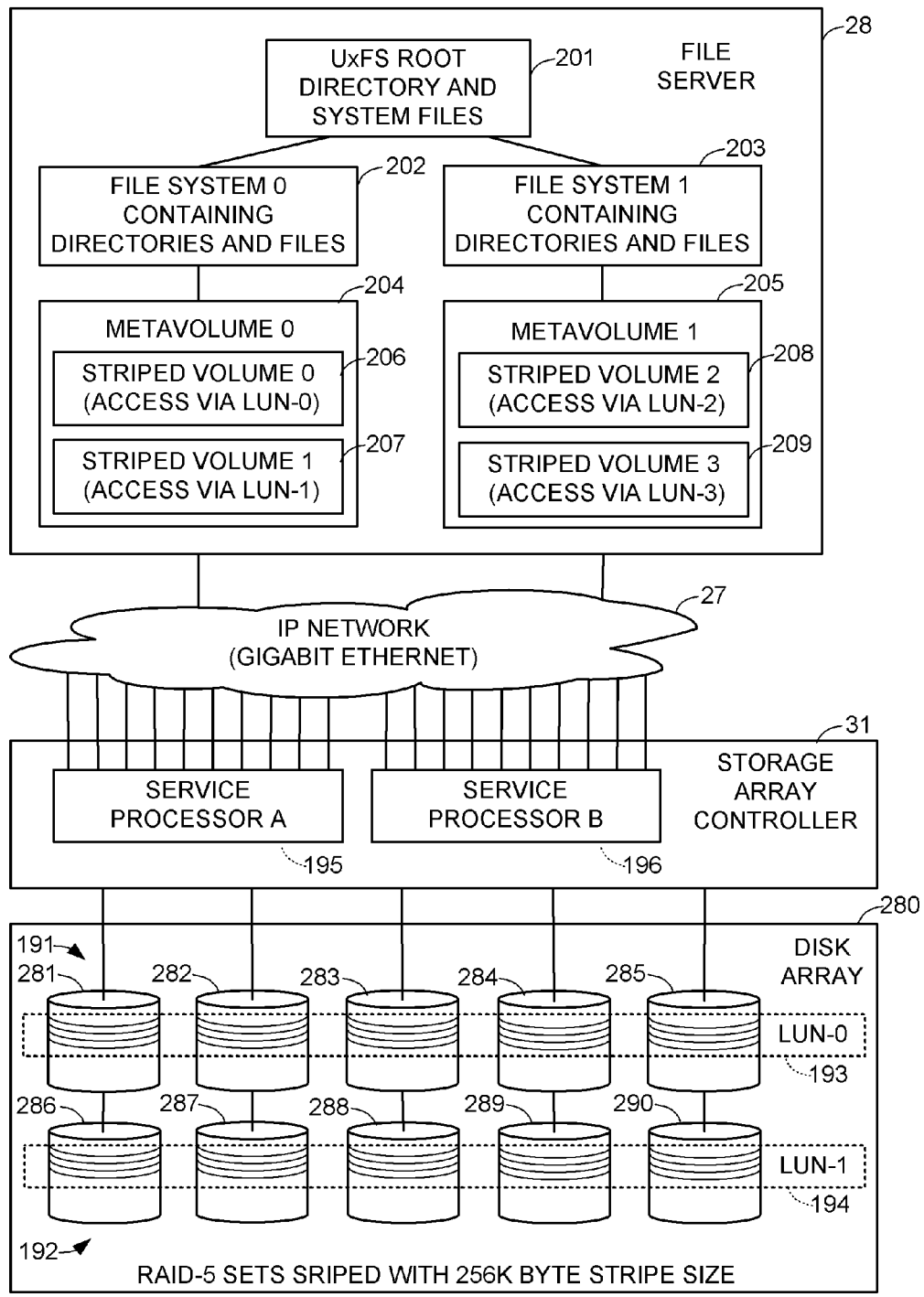
FIG. 12 is a block diagram showing metavolumes assembled from striped volumes accessed via respective logical units of storage (LUNS) in one of the data storage arrays of FIG. 1, and file systems built on the metavolumes.

FIG. 12 shows metavolumes 204, 205 assembled from striped volumes 206, 207, 208, 209 accessed via respective logical units of storage (LUNS) 193, 194 in a disk array 280 controlled by the storage array controller 31, and file systems 202, 203 built on the metavolumes. The disk array 280 includes a plurality of RAID-5 sets 191, 192 of disk drives. The RAID-5 set 191 includes disk drives 281, 282, 283, 284, 285. The RAID-5 set 193 includes disk drives 286, 287, 288, 289, 290. A LUN 193 is configured from striped partitions of the disk drives 281, 282, 283, 284, 285 using a 256 K byte stripe size. A LUN 194 is configured from striped partitions of the disk drives 286, 287, 288, 289, 290 using a 256 K byte stripe size.

The storage array controller 31 has two service processors 195, 196 each having access to disk drives. Each of the service processors 195, 196 has multiple ports to the IP network 27.

Each of the striped volumes 206, 207, 208, 209 is mapped to the storage of a respective LUN of the disk array 280. Therefore access in the file server to each of the striped volumes is satisfied by iSCSI access over the IP network 27 to the storage array controller for access to the respective LUN of storage in the disk array 280. The striped volumes 206, 207 are concatenated to form the metavolume 204, and the striped volumes 208, 209 are concatenated to form the metavolume 205.

The file system 202 is built upon the metavolume 204, and the file system 203 is built upon the metavolume 205. Each of the file systems 202, 203 contains a hierarchy of directories and files. The file systems 202, 203 are mounted to a UxFS root directory 201 including mounted file systems and system files.

FIG. 13 shows a first page of a Microsoft EXCEL brand spreadsheet 211 used as an input file for the file mapping protocol configuration utility. The spreadsheet 211 has a series of pages selected by respective tabs 212-218. The tabs include a tab 212 for selecting the "Welcome" page, a tab 213 for a "Control Station" page, a tab 214 for a "iSCSI Port" page, a tab 215 for a "DM_Interfaces" page, a tab 216 for a "CIFS Server" page, a tab 217 for a "File Systems" page, and a tab 218 for a "Client" page. Use of a spreadsheet as an input file is convenient for data entry by the systems administrator or a customer service representative on a laptop computer during a customer interview. In addition, the Microsoft EXCEL spreadsheet provides checking of entered values against a predefined set of legal values, and also provides checking for consistency among entered values. For example, if a value is entered in one cell of a row of a matrix, then values should be entered in the other cells of the row of the matrix, as shown and further described below with reference to FIGS. 14 to 19.

The "Welcome" page 211 in FIG. 13 explains that the pages selected by the tabs are populated with information specific to the site targeted for FMP. The "Welcome" page 211 further describes the kind of information entered on the page selected by each tab. The "Control Station" page is used for entering the Control Station IP Address, and the User name of the file server Administrator account. The "iSCSI Port" page is used for entering the data required to define the iSCSI ports on the storage array. The "DM Interfaces" page defines the interfaces on the file server. The "CIFS Server" page defines the CIFS servers on the file server. The "File Systems" page is used for entering the name of a number of drives, their type, the number of buses, the file system name, and the desired export type. The "Clients" page defines the fully qualified domain name of the iSCSI initiator, and the operating system (OS) type.

FIG. 14 shows a matrix 221 of data on the "Control Station" page of the spreadsheet of FIG. 13. This matrix includes a Control Station IP field, and an Administrator Name field. The data entered in the Control Station IP field should be the IP address of the control station that will have access to the control command interpreter of the file server. The data entered into the Administrator Name field should be the name of the root user account.

FIG. 15 shows a matrix 222 of data on the "iSCSI Port" page of the spreadsheet of FIG. 13. The data entered in this matrix should be used for FMP configuration unless the proper ports already have been set up prior to FMP configuration using another tool, such as the EMC Corporation CELERRA® Startup Assistant (CSA) wizard. For example, the port numbers available for FMP configuration in a system including an EMC Corporation CLARIION® brand data storage array can be found using the EMC Corporation NAVISPHERE brand storage management utility.

In FIG. 15, the data entered into the "SP" column of the matrix 222 identifies either an "A" or "B" service processor in the storage array controller for servicing the iSCSI port. The data entered into the "Port ID" column specifies a port number. The data entered into the "IP Address" column is a desired IP address of the port. The data entered into the "Subnet Mask" column is a subnet mask assigned to the port. The data entered into the "Gateway Address" column is a gateway address associated with the port. A value of [0.0.0.0] is entered into the "Gateway Address" column to specify that there is no gateway associated the port.

FIG. 16 shows a matrix 223 of data on the "DM Interface" page of the spreadsheet of FIG. 13. The data in this matrix 223 defines the interfaces on the file server. Each interface on the file server has an interface name, an interface IP address, a subnet mask, a gateway address, a broadcast address, a value for an Int_vtype parameter, and a list of interface physical ports. The Int_vtype parameter specifies a file server virtual interface methodology. The value for the Int_vtype parameter is either single, failsafe, or LACP.

FIG. 17 shows a matrix 224 of data on the "CIFS Server" page of the spreadsheet of FIG. 13. The data in this matrix specifies, for each CIFS server, a respective server name, a fully qualified domain name that the CIFS server should join, and a name of an administrator that has credentials to join the domain.

FIG. 18 shows a matrix 226 of data on a "File Systems" page of the spreadsheet of FIG. 13. The data in the matrix 226 defines one or more file systems on the file server. The data in this matrix 226 defines, for each file system, a file system physical disk count, a disk type, a file system bus count, a file system name, and an export type. The number of physical disks should be five or a multiple of five for RAID-disk striping. The file system size should be determined from customer requirements for storage, and then the number of physical disks should be calculated by dividing the file system size by the storage capacity per physical disk, and then this quotient should be rounded up to a multiple of five. The type of physical disks includes fibre-channel (FC), advanced technology attachment (ATA), or enterprise flash drive (EFD). The file system bus count is the number of backend busses that will be required for throughput. The export type specifies the protocol that the file system exports, such as CIFS, NFS, or CIFS and NFS.

FIG. 19 shows a matrix 227 of data on a "Client" tab of the spreadsheet of FIG. 13. The data in the matrix 227 specifies, for each iSCSI client, a fully qualified domain name of the iSCSI client, and an operating system (OS) for each client. The operating system, for example, is either the Microsoft WINDOWS operating system, or the LINUX operating system. The FMP configuration utility may use the data in the matrix 227 for registering the iSCSI qualified name (IQN) of each of the iSCSI clients with the storage array controller, and adding the IQN of each of the iSCSI clients to a storage group created by the FMP configuration utility.

The FMP configuration utility is executed by double clicking on a program icon named "isv.exe" in an install directory on the CD ROM (97 in FIG. 3). The FMP configuration utility begins by presenting a password dialog window to the system administrator. The system administrator enters a control station password, and then a Domain Administrator password. Once the passwords are entered correctly, a connection session with the control station begins in a separate command window. The FMP utility imports the data from the spreadsheet of FIG. 13 and validates the spreadsheet by checking the control station IP address and administrator name in the matrix (221 in FIG. 14) of control station information. If the control station IP address and the administrator name are correct for the control station handling the configuration session, then the FMP utility presents a graphical user interface (GUI) window 230 as shown in FIG. 20.

The GUI window 230 shows a series of tabs 231-236 enabling the system administrator to select pages for queuing up possible configuration changes, and then applying the queued configuration changes. The page shown in FIG. 20 is the page associated with the "iSCSI Targets" tab 231. This page includes a left-hand panel 237 showing details of the existing iSCSI configuration, and a right-hand panel 238 showing details of the planned iSCSI configuration. The existing iSCSI configuration is obtained from the file server configuration database (34 in FIG. 1), and the planned iSCSI configuration is imported from the matrix (222 in FIG. 15) of iSCSI port data from the spreadsheet of FIG. 13. Each panel 237, 238 has a respective scroll bar 239, 240 for reviewing data that cannot all be presented in the window at the same time due to the limited window size.

Figure 20:
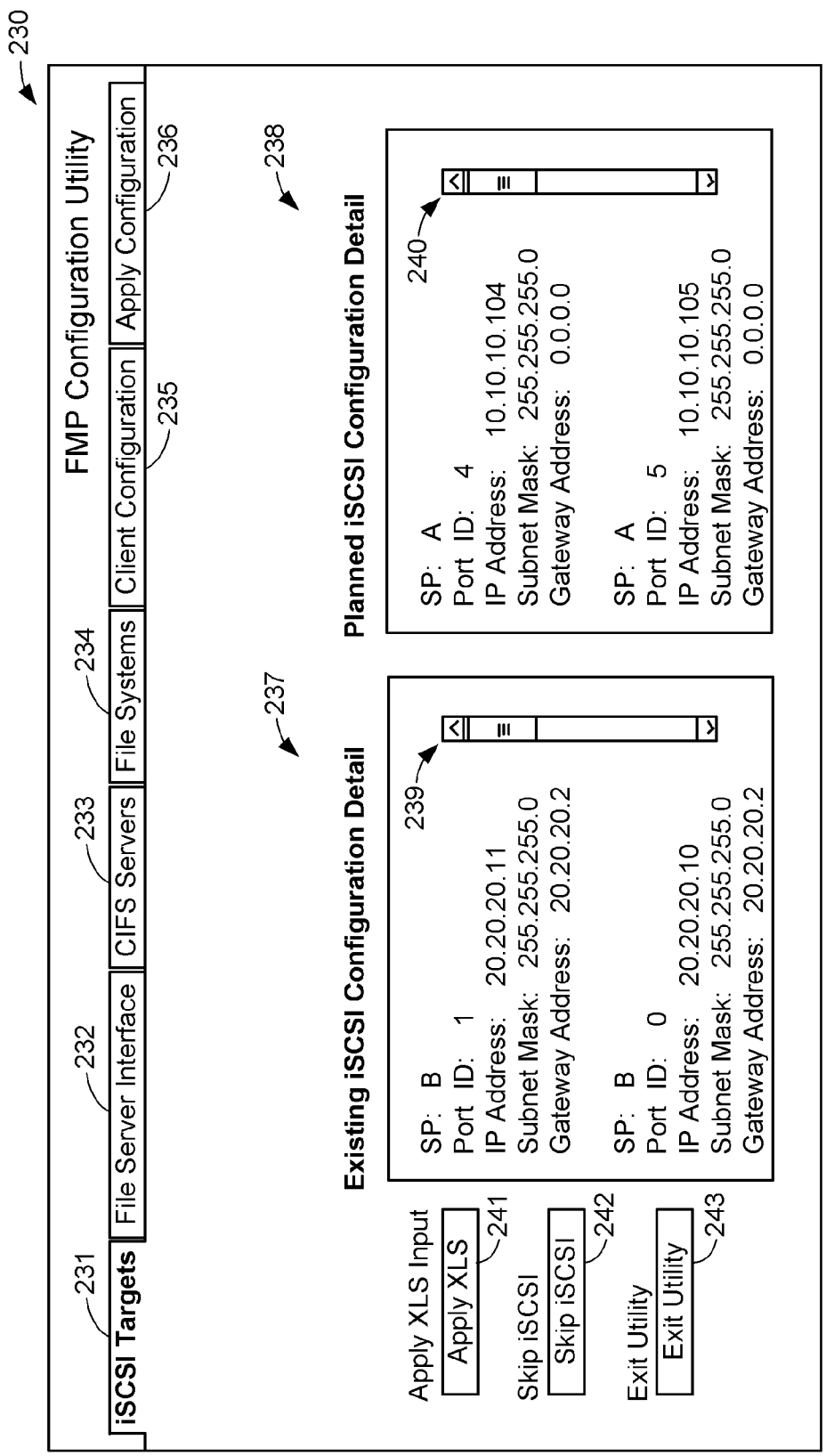
FIG. 20 shows a display screen of the file mapping protocol configuration utility graphical user interface for selecting iSCSI targets.

The page shown in FIG. 20 has three user selection buttons 241, 242, 243. The system administrator may operate the mouse (96 in FIG. 3) to click on the first button 241, which would cause the XLS input (i.e., the planned iSCSI configuration detail shown in the right-hand panel 238) to be marked as a configuration change to be applied later when the GUI displays the page associated with the "Apply Configuration" tab 236. In addition, clicking on the first button 241 would cause the GUI to display the page associated with the "File Server Interface" tab 232.

The system administrator may operate the mouse (96 in FIG. 3) to click on the second button 242, which would cause the XLS input (i.e., the planned iSCSI configuration detail shown in the right-hand panel 238) to be marked as skipped, so that the existing iSCSI configuration detail would remain for the data processing system if the configuration were applied later when the GUI displays the page associated with the "Apply Configuration" tab 236. In addition, clicking on the first button 241 would cause the GUI to display the page associated with the "File Server Interface" tab 232. The system administrator may operate the mouse (96 in FIG. 3) to click on the third button 243, which would terminate execution of the FMP configuration utility.

The page associated with the "File Server Interface" tab 232 is similar to the page shown in FIG. 20 except that the left-hand panel 237 would show the existing File Server Interface detail, the right-hand panel 238 would show the planned File Server Interface detail imported from the matrix (223 in FIG. 16) of File Server Interface data from the spreadsheet of FIG. 13, and the second button 242 would be labeled "Skip DM Interface." Clicking on the first button 241 or the second button 242 would cause the GUI to display the page associated with the "CIFS Servers" tab 233.

The page associated with the "CIFS Servers" tab 233 is similar to the page shown in FIG. 20 except that the left-hand panel 237 would show the existing CIFS Servers configuration detail, the right-hand panel 238 would show the planned CIFS Servers configuration detail imported from the matrix (224 in FIG. 17) of CIFS Servers data from the spreadsheet of FIG. 13, and the second button 242 would be labeled "Skip CIFS Servers." Clicking on the first button 241 or the second button 242 would cause the GUI to display the page associated with the "File Systems" tab 234.

The page associated with the "File Systems" tab 234 is similar to the page shown in FIG. 20 except that the left-hand panel 237 would show the existing File Systems configuration detail, the right-hand panel 238 would show the planned File Systems configuration detail imported from the matrix (226 in FIG. 18) of File System data from the spreadsheet of FIG. 13, and the second button 242 would be labeled "Skip File Systems." Clicking on the first button 241 or the second button 242 would cause the GUI to display the page associated with the "Client Configuration" tab 235.

The page associated with the "Client Configuration" tab 235 is similar to the page shown in FIG. 20 except that the left-hand panel 237 would show the existing Client Configuration detail, the right-hand panel 238 would show the planned Client Configuration detail imported from the matrix (227 in FIG. 19) of Client Configuration data from the spreadsheet of FIG. 13, and the second button 242 would be labeled "Skip Client Configuration." Clicking on the first button 241 or the second button 242 would cause the GUI to display the page associated with the "Apply Configuration" tab 236.

Figure 21:
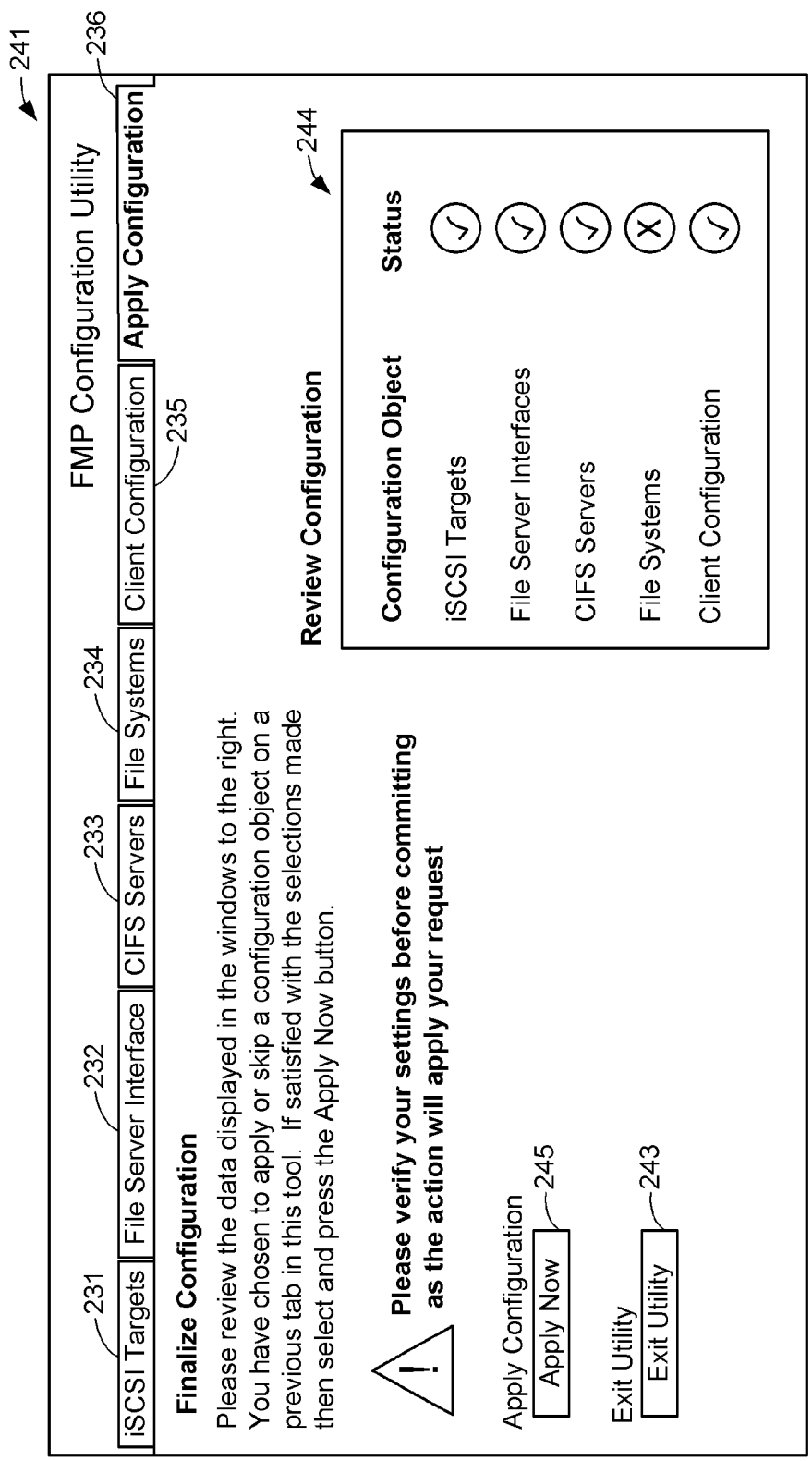
FIG. 21 shows a display screen of the file mapping protocol configuration utility graphical user interface for finalizing a configuration.

FIG. 21 shows a display screen 241 of the GUI showing the page associated with the "Apply Configuration" tab 236. This display screen 241 includes a "Review Configuration" panel 244 on the right-hand side, and an "Apply Now" button 245 and the "Exit Utility" button 243 on the left-hand side. The display screen 241 also includes instructions to review the data displayed in the panel 244, and advises that the user has chosen either to apply or skip each configuration object on a previous tab. The display screen 241 also instructs the user to select and press the "Apply Now" button 245 if satisfied with the selections made. The display screen 241 further includes a warning that the user's settings should be verified before committing as the action will apply the user's request.

The "Review Configuration" panel 244 lists the configuration objects and the status of each configuration object. The configuration objects include iSCSI Targets, File Server Interfaces, CIFS Servers, File Systems, and Client Configuration. The status of each configuration object is either apply or skip. The apply status is indicated by a check mark in circle filled in with a green color, and the skip status is indicted by an X in a circle filled in with a red color.

From the "Apply Configuration" display screen 241 as shown in FIG. 21, the system administrator may go back to any one of the previous pages by clicking on one of the upper tabs 231, 232, 233, 234, 235 in order to change the status of the configuration object associated with the selected upper tab. The system administrator also may click on the "Apply Now" button to apply the configuration changes associated with the configuration objects having the "apply" status, or the system administrator may click on the "Exit Utility" button 243 to terminate execution of the FMP configuration utility without applying any configuration changes.

If the system administrator clicks on the "Apply Now" button, the FMP configuration utility produces a series of control commands to implement the configuration changes. During the production of these control commands, there is a check that system resources are available for successful execution of the control commands. If the required system resources are not available, then the FMP configuration utility displays to the system administrator an appropriate message of the deficiency and a recommendation as to how the deficiency should be dealt with. For example, the system administrator may be advised of a resource limitation and a recommendation that the system administrator should go back and skip the changes to a certain configuration object, or else exit the FMP configuration utility, edit the spreadsheet, and re-run the FMP configuration utility. In another example, the system administrator may be advised that inoperative disk drives or interfaces should be replaced, or that particular files are missing or cannot be opened or have contents that have been corrupted, and this problem should be fixed before the configuration changes will be applied. In this case, the system administrator may be given the option of saving the execution state of the FMP configuration utility before terminating execution so that execution may be resumed once the problem has been corrected.

Once the series of control commands has been produced, the control commands are sent to the control command interpreter (81 in FIG. 3) of the file server (28 in FIG. 3) so that the file server executes the control commands. Groups of the control commands perform respective steps in a sequence of fourteen steps. These steps include file read; array discovery; interface setup; start CIFS service; add CIFS server; join CIFS Server to the domain; iSCSI port setup; iSCSI client setup; file system setup; add LUNs to the storage group; diskmarking, dvol mapping, and striping volumes; storage pool and file system creation and export and mount; starting FMP service, and thread count setting to 128 threads. Following is an example of control commands for performing the sequence of fourteen steps.

Step 1. File Read.
Action: The tool reads in the configuration files located in the \data directory.
Starting /tmp/configure_celerra.sh execution.
Preparing environment.
Reading in the client hosts file.
Reading in the iSCSI ports file.
Reading in the DM interfaces file.
Reading in the filesystem list file.
Reading in the CIFS server file.
Step 2. Array Discovery.
Action: The storage array controller will be discovered next. The script executes a series of commands to try to ascertain the storage array environment, looking at disk information and iSCSI port information.
Finding CLARiiONs.
Querying the CLARiiON for disk information.
Completed querying for disk info.
Querying the CLARiiON for iSCSI port information.
Completed querying for iSCSI port info.
Step 3. Interface Setup.
Action: This command sets up the interface(s) specified on the file server. The script uses the server_ifconfig command which manages network interface configuration. server_ifconfig creates a network interface, assigns an IP address to a network interface, enables and disables an interface, sets the MTU size and the VLAN ID, and displays network interface parameters for the specified file server.
Beginning file server interface setup.
server_ifconfig server_2-create -Device cge0 -name interface1 -protocol IP 172.24.252.64 255.255.255.0 172.24.252.255
Step 4. Start CIFS service & Synchronize the Time Server.
Action: The server_setup command sets up the type and protocol component for the specified file server. Using -P CIFS selects the protocol configuration to be managed. Multiple protocol configurations can be enabled for a file server. The CIFS service is disabled in the file server by default. This command attempts to start the CIFS services on the file server.
server_setup server_2 -P cifs -o start
Action: The script attempts to synchronize the time with the ntp server. The server_date timesvc commands control the synchronization of the file server with external timing sources and gets and sets the time zone.
server_date ALL timesvc update ntp
server_2: done
server_3: done
Step 5. Adding CIFS server.
Action: This command will attempt to add the cifs server defined in the xls file.
server_cifs server_2 -add compname=fileserver 1,domain=nascse.emc, interface=interface1
Step 6. Join CIFS Server to the domain.
Action: The join command -Join Creates an account for the CIFS server in the Active Directory. By default, the account is created under the domain root as:
ou=Computers,ou=EMC Celerra.
server_cifs server_2 -Join compname=fileserver1,domain=nascse.emc, admin=administrator
Completed CIFS server setup.
Step 7. iSCSI port setup.
Action: The naviseccli connection command with the -setport function modifies the properties of a specified SP port. This command will set up the ports for iscsi starting with the first iscsi port which is port 4 to the array.
navicli -h 172.24.252.24 connection -setport -sp A -portid 4-address 45.252.3.107 - subnetmask 255.255.255.0 -gateway 45.252.3.1 -o
Completed iSCSI port setup.
Step 8. iSCSI client setup.
Action: This command creates the disk array storage group called mpfs_clients which will house the luns and the clients. This is done by using the -gname switch with -create.
Using the -gname StorageGroupName specifies a user-defined storage group name. navicli -h 172.24.252.24 storagegroup -create -gname mpfs_clients
This command sets the client path for each client that is listed in the xls file to a port on both SPA and B starting with the first available iSCSI port. This command repeats for all the defined clients.
navicli -h 172.24.252.24 storagegroup -setpath -o -gname mpfs_clients -hbauid iqn.2009-02.com.emc.celerra.mpfs: eng252204.nascse.emc -sp a -spport 4-failovermode 1 -arraycommpath 1
navicli -h 172.24.252.24 storagegroup -setpath -o -gname mpfs_clients -hbauid iqn.2009-02.com.emc.celerra.mpfs: eng252204.nascse.emc -sp b -spport 4-failovermode 1 -arraycommpath 1
Completed iSCSI client setup.
Step 9. File System Setup—Creating RAID Groups and Binding the LUN.
Action: The file system setup will check to see what the available disks are in the system and verify to that the appropriate number of hot spares is available before attempting the creation. Each file system that contains 30 drives will require 1 hot spare (for example 45 drives specified will require 2 hot spares). The script will round down to in multiples of 5 (RAID 4+1) is the RAID type in use and therefore x time 5 disks must be used.
Found enough FC disks of size 274845 for the FS01 file system and its hot spares.
INFO: Using 37 disks for creating the FS01 file system and its hot spares.
Total raw capacity used=10169265.
Building the Hot Spares.

```
navicli -h 172.24.252.24 createrg 201 0_0_6
navicli -h 172.24.252.24 createrg 202 0_0_7
STATUS: Building the RAID Groups.
STATUS: Building the LUNs.
navicli -h 172.24.252.24 bind r5 18 -rg 16-cap 1125626880
-sq be -sp a
navicli -h 172.24.252.24 bind r5 19 -rg 16-cap 1125626880
-sq be -sp b
```
The script then builds the RAID groups and in accordance to the best practices will bind the LUNs alternating the first LUN to the correct service process on the storage array controller.

Step 10. LUNs are Added to the Storage Group.

Action: This command will add the LUNs to the storage group called mpfs_clients. The flag -hlu hlunumber specifies the host LUN number, which is the number that the storage-system server will see. hlunumber is the virtual LUN number. (Virtual LUN numbers let a host whose operating system has LUN limit or LUN booting restrictions use a number other the actual storage-system LUN ID (-alu below),which might be out of the operating system's range, to access a LUN.) This switch is required along with -alu and either the -gname or -uid switch.

The -alu alunumber specifies the storage-system LUN number, the actual LUN number internal to the storage system. This is the number assigned when the LUN was bound. alunumber specifies the logical unit number. This switch is required along with -hlu and either the -gname or -uid switch.

```
navicli -h 172.24.252.24 storagegroup -addhlu -gname mpfs-
_clients -hlu 18 -alu 18
```

Step 11. Diskmark, Dvol Mapping, and Striping Volumes Across the dvols.

Action: The Diskmark is the process of giving the disks a d# for use by the file server. This command Queries SCSI devices and saves them into the device table database on the file server. Once disk marking has occurred the dvols are mapped to the storage array LUNs. The striped volumes are spread across the volumes in 256k strip sizes.

```
nas diskmark -mark -all
```

Stripe is created called FS01Stripe0 size of 256 bytes on the dvols 42, 44, 46, 49, 51, 53 nas_volume -name FS01stripe0-create -Stripe 262144 d40x,d49,d42,d51,d44, d53,d46 name=FS01stripe0

Disregard the standard Celerra warning about truncating the volume; this is expected.

```
Warning 17716815759: truncating volume
nas_volume -name FS01stripe1 -create -Stripe 262144 d48,
d41,d50,d43,d52,d45,d54
```

The striped volumes are concatenated together to form a meta,

```
nas_volume -name FS01_meta -create -Meta FS01stripe0,
FS01stripe1
```

Step 12. User Defined Storage Pool Definition; File System Creation, Export, & Mount.

Action: A user defined pool is created from the Meta volume created in step 11. The file system is then made from that storage pool. A mount point is made and the file system is then exported.

```
nas_pool -create -name FS01_pool -volumes FS01_meta
name=FS01_pool
server_export server_2 -name FS01/FS01
```

Step 13. Starting FMP

Action: If FMP fails to start try the command again. Check the log by running server_log server_2. Correct any issues that the log instructs.

```
server_setup server_2 -P mpfs -o start
```

Step 14. Applying the Best Practices Recommend Thread Count Setting on the File Server.

Action: This command sets the number of NFS/FMP threads on the file server to 128.

Run server_mpfs <movername> -Stats to verify the number of threads and increase the number to 128 using server_mpfs <movername> -add n, where n is the difference between 128 and the current.

```
server_mpfs server_2-set threads=128
```

Although the data storage system has been described above with respect to a typical system in which one file server may support multiple host processors and use multiple data storage controllers, it should be appreciated that the configuration utility may be run on a single control station in order to produce control commands sent to more than one file server in order to configure a system including more than one file server. In the case of a system including more than one file server, each of the fourteen steps described above could include a series of control commands sent to each of the file servers. In any case, the system administrator can execute the FMP configuration utility at one control station to re-configure the file servers, storage array controllers, and the host processors in the system to enable the host processors to use FMP for obtaining file mapping information from the file servers, formulating storage block access commands from the file mapping information, and accessing storage by sending the storage block access commands to the storage array controllers.

In view of the above, there has been described a configuration utility for configuration of a data storage system using a file mapping protocol for access to a distributed file system. Environmental information required for the configuration utility program is collected and qualified via a spreadsheet. This spreadsheet can be routed for customer review and approval prior to using the spreadsheet as an input file to the configuration utility. The configuration utility provides a comparison of the present configuration to the new configuration specified in the spreadsheet, and provides a system administrator with an option of applying or skipping the new configuration information for multiple classes of configuration objects including iSCSI targets on the storage array controllers, file server interfaces for host access to file mapping information, CIFS servers, file systems, and iSCSI clients on the host processors. Once the system administrator approves the selected configuration changes, the configuration utility produces a series of control commands for execution by a control command interpreter of the file server in order to change configuration settings in the file server and in the storage array controllers, and the configuration utility also produces a log of configuration information for use by a host processor configuration program to direct file access metadata requests from the host processors to the file server and iSCSI storage block access requests from the host processors to the storage array controllers. Therefore the system administrator's control station computer provides a single location and the configuration utility provides a single point in time from which the system administrator approves and changes the configuration settings on the file server and the storage array controllers. A configuration job can be performed more quickly and the result is repeatable given the same configuration information to be applied from the spreadsheet. Moreover, the amount of manual effort for a configuration change is reduced, so that the configuration result is less subject to human error.

What is claimed is:

1. A method of configuring a data processing system for using a file mapping protocol, the data processing system including at least one file server computer, at least one storage array controller controlling access to at least one data storage array, and at least one host processor, the configuring of the data processing system enabling said at least one host processor to use the file mapping protocol for obtaining file mapping information from said at least one file server computer, formulating storage block access commands from the file mapping information, and accessing data storage by sending the storage block access commands to said at least one storage array controller, said method comprising:

- inserting, into a spreadsheet, configuration information specifying new configuration objects for multiple classes of configuration objects used in the file mapping protocol, the multiple classes of configuration objects including a storage array controller interface class of storage array controller interfaces for receiving the storage block access commands from said at least one host processor, a file server interface class of file server interfaces for providing the file mapping information to said at least one host processor, a file systems class of file systems built on the data storage, and a host processor interface class of host processor interfaces for sending the storage block access commands to said at least one storage array controller; and
- displaying to a systems administrator a present configuration of each of the multiple classes of configuration objects, and for each of the multiple classes of configuration objects, presenting to the systems administrator the new configuration objects and an option of either applying the new configuration objects or skipping the new configuration objects, and once the systems administrator has chosen to either apply or skip the new configuration objects of each of the multiple classes of configuration objects, presenting to the systems administrator a summary indicating whether the systems administrator has chosen to either apply or skip the new configuration objects of each of the multiple classes of configuration objects, and presenting to the systems administrator an option to produce control commands from the configuration information specifying the new configuration objects in the classes of configuration objects that are not chosen to be skipped, and
- once the system administrator has chosen to produce control commands from the configuration information specifying the new configuration objects in the classes of configuration objects that are not chosen to be skipped, producing control commands from the configuration information specifying the new configuration objects in the classes of configuration objects that are not chosen to be skipped, and
- executing the control commands produced from the configuration information specifying the new configuration objects in the classes of configuration objects that are not chosen to be skipped in order to change configuration settings in said at least one file server computer and in said at least one storage array controller to configure the data processing system so that the file mapping protocol uses the new configuration objects in the classes of configuration objects that are not chosen to be skipped.

2. The method as claimed in claim 1, which includes:
- a human user inserting into a first page of the spreadsheet the configuration information specifying new storage array controller interfaces for receiving the storage block access commands from said at least one host processor,
- the human user inserting into a second page of the spreadsheet the configuration information specifying new file server interfaces for providing the file mapping information to said at least one host processor,
- the human user inserting into a third page of the spreadsheet the configuration information specifying new file systems built on the data storage, and
- the human user inserting into a fourth page of the spreadsheet the configuration information specifying new host processor interfaces for sending the storage block access commands to said at least one storage array controller.

3. The method as claimed in claim 2, which includes displaying the present configuration of each of the multiple classes of configuration objects in a first panel on a page for said each of the multiple classes of configuration objects, and displaying the new configuration of each of the multiple classes of configuration objects in a second panel on the page for said each of the multiple classes of configuration objects.

4. The method as claimed in claim 1, wherein the control commands produced from the configuration information specifying the new configuration objects in the classes of configuration objects that are not chosen to be skipped are executed by a command interpreter in said at least one file server computer in order to change configuration settings in said at least one file server computer and in said at least one storage array controller to configure the data processing system so that the file mapping protocol uses the new configuration objects in the classes of configuration objects that are not chosen to be skipped.

5. The method as claimed in claim 1, wherein the control commands are produced by a control station computer executing the configuration program, and the control station computer is operated by the systems administrator so that the control station computer provides a single location from which the systems administrator changes the configuration settings in the file server computer and in the storage array controller to configure the data processing system for using the file mapping protocol.

6. The method as claimed in claim 1, wherein the multiple classes of configuration objects further include a Common Internet File System (CIFS) server class of CIFS servers in said at least one file server computer, and wherein the method further includes the systems administrator choosing to apply new CIFS servers so that the new CIFS servers are configured in said at least one file server computer when the data processing system is configured for using the file mapping protocol.

7. The method as claimed in claim 1, which includes the systems administrator choosing to apply a new file system, and which includes producing control commands for creating the new file system by creating Redundant Array of Inexpensive Disk RAID-5 groups, binding logical unit numbers (LUNs) to the RAID-5 groups, adding the LUNs to a storage group, creating striped volumes with a 256 K byte stripe size upon the LUNs, concatenating the striped volumes to form a meta volume, building the new file system on the meta volume, and mounting and exporting the new file system.

8. A computer-implemented method of at least one data processor executing instructions of a configuration program in memory to configure a data processing system for using a file mapping protocol, the data processing system including at least one file server computer, at least one storage array controller controlling access to at least one data storage array, and at least one host processor, the configuring of the data processing system enabling said at least one host processor to use the file mapping protocol for obtaining file mapping information from said at least one file server computer, formulating storage block access commands from the file mapping information and accessing data storage by sending the storage block access commands to said at least one storage array controller, said method comprising:

receiving configuration information specifying new configuration objects used in the file mapping protocol, the new configuration objects including storage array controller interfaces for receiving the storage block access commands from said at least one host processor, file server interfaces for providing the file mapping information to said at least one host processor, file systems built on the data storage, and host processor interfaces for sending the storage block access commands to said at least one storage array controller; and producing control commands from the configuration information specifying the new configuration objects used in the file mapping protocol, the control commands being executable to change configuration settings in said at least one file server computer and in said at least one storage array controller to configure the data processing system for using the file mapping protocol;

wherein said method further includes:

displaying to a systems administrator a present configuration of each of multiple classes of configuration objects, the multiple classes of configuration objects including a storage array controller interface class of storage array controller interfaces for receiving the storage block access commands from said at least one host processor, a file server interface class of file server interfaces for providing the file mapping information to said at least one host processor, a file systems class of file systems built on the data storage, and a host processor interface class of host processor interfaces for sending the storage block access commands to said at least one storage array, and for each of the multiple classes of configuration objects, presenting to the systems administrator the new configuration objects and an option of either applying the new configuration objects or skipping the new configuration objects, and once the systems administrator has chosen to either apply or skip the new configuration objects of each of the multiple classes of configuration objects, presenting to the systems administrator a summary indicating whether the systems administrator has chosen to either apply or skip the new configuration objects of each of the multiple classes of configuration objects, and presenting to the systems administrator an option to produce control commands from the configuration information specifying the new configuration objects in the classes of configuration objects that are not chosen to be skipped.

9. The computer-implemented method as claimed in claim 8, which includes displaying the present configuration of each of the multiple classes of configuration objects in a first panel on a page for said each of the multiple classes of configuration objects, and displaying the new configuration of each of the multiple classes of configuration objects in a second panel on the page for said each of the multiple classes of configuration objects.

10. A data processing system comprising:
at least one file server computer;
at least one storage array controller controlling access to at least one data storage array;
at least one host processor; and
at least one control station computer including a memory and a configuration program in the memory, the configuration program being executable by the control station computer to configure said at least one file server computer and said at least one storage array controller to enable said at least one host processor to use a file mapping protocol for obtaining file mapping information from said at least one file server computer, formulating storage block access commands from the file mapping information, and accessing data storage by sending the storage block access commands to said at least one storage array controller;

wherein the configuration program is executable by the control station computer to receive configuration information specifying new configuration objects used in the file mapping protocol, the new configuration objects including storage array controller interfaces for receiving the storage block access commands from said at least one host processor, file server interfaces for providing the file mapping information to said at least one host processor, file systems built on the data storage, and host processor interfaces for sending the storage block access commands from said at least one host processor to said at least one storage array controller;

wherein the configuration program is executable by the control station computer for producing control commands from the configuration information specifying the new configuration objects used in the file mapping protocol, and the control commands are executable by a command interpreter in said at least one file server computer to change configuration settings in said at least one file server computer and in said at least one storage array controller to configure the data processing system for using the file mapping protocol; and wherein the configuration program is executable by the control station computer to display to a systems administrator a present configuration of each of multiple classes of configuration objects, the multiple classes of storage objects including a storage array controller interface class, a file server interface class, a file systems class, and a host processor interface class, and the configuration program is further executable by the control station computer to present to the systems administrator, for each of the multiple classes of configuration objects, the new configuration objects and an option of either applying the new configuration objects or skipping the new configuration objects, and once the systems administrator has chosen to either apply or skip the new configuration objects of each of the multiple classes of configuration objects, to present to the systems administrator a summary indicating whether the systems administrator has chosen to either apply or skip the new configuration objects of each of the multiple classes of configuration objects, and to present to the systems administrator an option to produce control commands from the configuration information specifying the new configuration objects in the classes of configuration objects that are not chosen to be skipped.

11. The data processing system as claimed in claim 10, wherein the configuration program is executable by the control station computer to display the present configuration of each of the multiple classes of configuration objects in a first panel on a page for said each of the multiple classes of configuration objects, and to display the new configuration of each of the multiple classes of configuration objects in a second panel on the page for said each of the multiple classes of configuration objects.

* * * * *